(12) United States Patent
Tang et al.

(10) Patent No.: US 11,464,070 B2
(45) Date of Patent: Oct. 4, 2022

(54) DATA BUFFERING METHOD AND SESSION MANAGEMENT FUNCTION ENTITY

(71) Applicant: Huawei Technologies Co., Ltd., Shenzhen (CN)

(72) Inventors: Tingfang Tang, Shenzhen (CN); Yan Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/661,101

(22) Filed: Oct. 23, 2019

(65) Prior Publication Data

US 2020/0084829 A1 Mar. 12, 2020

Related U.S. Application Data

(63) Continuation of application No. PCT/CN2018/081803, filed on Apr. 4, 2018.

(30) Foreign Application Priority Data

May 11, 2017 (CN) .......................... 201710331440.9
Jun. 20, 2017 (CN) .......................... 201710470680.7

(51) Int. Cl.
*H04W 80/10* (2009.01)
*H04W 76/34* (2018.01)
(Continued)

(52) U.S. Cl.
CPC ............. *H04W 80/10* (2013.01); *H04W 8/12* (2013.01); *H04W 48/16* (2013.01); *H04W 76/34* (2018.02)

(58) Field of Classification Search
CPC ............................... H04W 80/10; H04W 76/34
See application file for complete search history.

(56) References Cited

U.S. PATENT DOCUMENTS 10,568,061 B1 * 2/2020 Park ........................ H04W 8/02
10,575,139 B2   2/2020 Kim et al.
(Continued)

FOREIGN PATENT DOCUMENTS

CN      101563887 A    10/2009
EP        1914928 A1    4/2008
(Continued)

OTHER PUBLICATIONS

Qualcomm Incorporated, NPL Publication "23.501—AMF-SMF implications of optimal UPF placement", S2-171714, pp. 1-6, Mar. 27-31, 2017.*

(Continued)

*Primary Examiner* — Jackie Zuniga Abad
(74) *Attorney, Agent, or Firm* — Conley Rose, P.C.

(57) ABSTRACT

A data buffering method including: a session management function (SMF) interacting with a first user plane function (UPF1) and a second UPF2, such that the UPF1 sends first downlink data of a first session to an access network device via UPF2, where UPF1 is an anchor of the first session; and the SMS releasing UPF2 in a procedure in which a terminal device enters an idle state and a transmission resource associated with the first session in an access network is released, where UPF1 buffers incoming second downlink data of the first session. After the terminal device is switched to a connected state, both a transmission path of incoming third downlink data of the first session and that of the buffered second downlink data pass through UPF1, UPF3, the access network device, and the terminal device successively.

20 Claims, 20 Drawing Sheets

(51) Int. Cl.
*H04W 8/12* (2009.01)
*H04W 48/16* (2009.01)

(56) References Cited

U.S. PATENT DOCUMENTS

| | | | | |
|---|---|---|---|---|
| 2018/0227743 | A1* | 8/2018 | Faccin | H04W 76/10 |
| 2018/0279397 | A1* | 9/2018 | Faccin | H04W 8/18 |
| 2019/0373520 | A1* | 12/2019 | Sillanpaa | H04W 36/14 |

FOREIGN PATENT DOCUMENTS

| | | | |
|---|---|---|---|
| WO | 2016164083 | A1 | 10/2016 |
| WO | 2016186414 | A1 | 11/2016 |
| WO | 2019033281 | A1 | 2/2019 |

OTHER PUBLICATIONS

U.S. Appl. No. 62/455,629, Publication Feb. 7, 2017, pp. 1, 4-8.*
Samsung, "TS 23.502 Buffering of downlink data during Xn based inter RAN HO (section 4.9.1.1.2)," 3GPP Draft, S2-173349, May 9, 2017, XP051268799, 2 pages.
3GPP TS 23.502, V0.3.0, "3rd Generation Partnership Project; Technical Specification Group Services and System Aspects; Procedures for the 5G System; Stage 2 (Release 15)," Mar. 2017, 115 pages.
3GPP TS 23.501, V0.4.0, "3rd Generation Partnership Project; Technical Specification Group Services and System Aspects; System Architecture for the 5G System; Stage 2 (Release 15)," Apr. 2017, 124 pages.
Foreign Communication From a Counterpart Application, PCT Application No. PCT/CN2018/081803, English Translation of International Search Report dated Jun. 27, 2018, 2 pages.
Foreign Communication From a Counterpart Application, PCT Application No. PCT/CN2018/081803, English Translation of Written Opinion dated Jun. 27, 2018, 4 pages.
3GPP TR 23.799 V1.0.2, "3rd Generation Partnership Project; Technical Specification Group Services and System Aspects; Study on Architecture for Next Generation System (Release 14)," Sep. 2016, 423 pages.
Samsung, "TS 23.501, Buffering of downlink data," SA WG2 Meeting #119, Dubrovnik, Croatia, S2-171025, Feb. 13-17, 2017, 2 pages.
Huawei, et al., "TS 23.501: Mobility area change event subscription," 3GPP TSG SA WG2 Meeting #121, Hangzhou, China, S2-173136, May 15-19, 2017, 3 pages.
Huawei, "TS 23.502: Avoid storing PDU session state in AMF and update related procedures," SA WG2 Meeting #121, Hangzhou, P. R. China, S2-173139, May 15-19, 2017, 12 pages.
Samsung "TS 23.502: Updates to Inter NG-RAN Node HO Procedure (Section 4.9.1.2.2)," SA WG2 Meeting #121, Hangzhou, China, S2-173348, May 15-19, 2017, 9 pages.

* cited by examiner

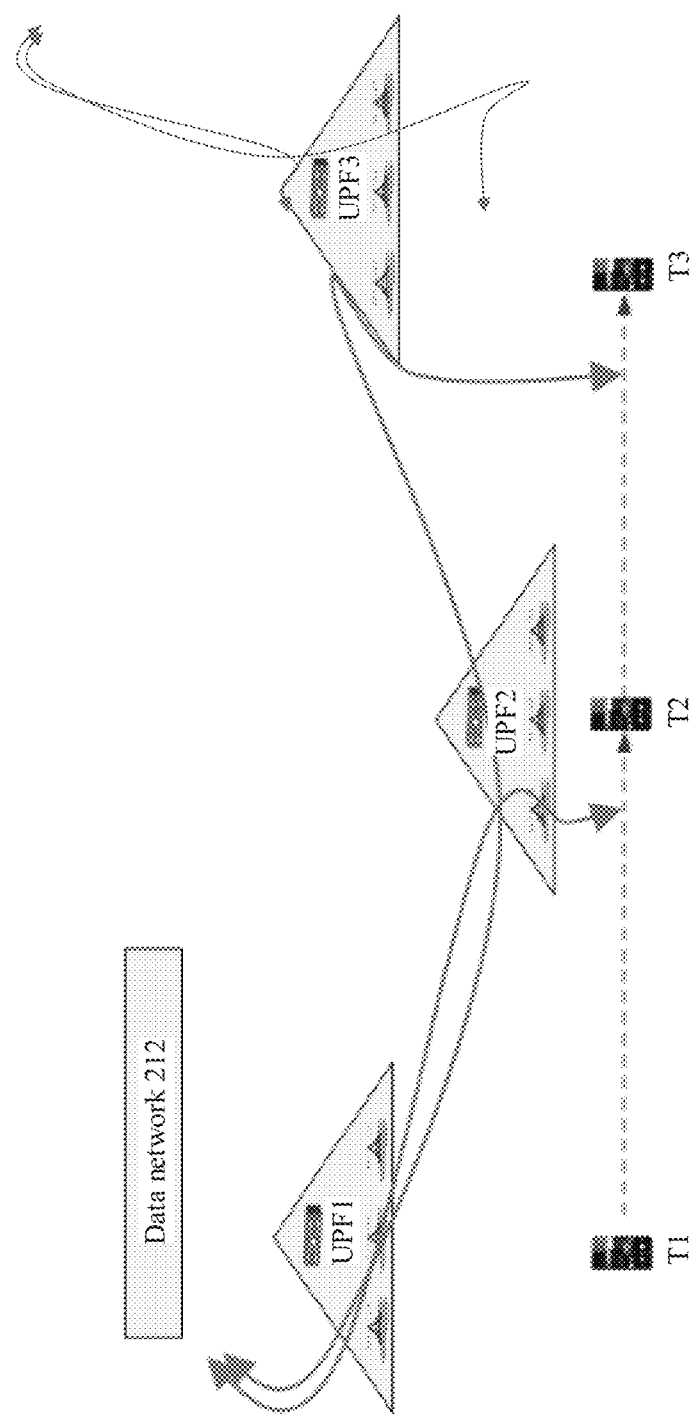

902. A session management function entity separately interacts with a second user plane function entity and a first user plane function entity, so that the first user plane function entity sends first downlink data of a first session to an access network device by using the second user plane function entity 904. The session management function entity instructs, based on a preset condition, the second user plane function entity to buffer second downlink data of the first session, where the preset condition includes: SSC information indicates that the first session has an SSC3 mode 906. The session management function entity separately interacts with a third user plane function entity and the second user plane function entity, so that the second user plane function entity sends the second downlink data to the access network device by using the third user plane function entity, and the first user plane function entity sends third downlink data to the access network device by using the second user plane function entity and the third user plane function entity

FIG. 9

DATA BUFFERING METHOD AND SESSION MANAGEMENT FUNCTION ENTITY

CROSS-REFERENCE TO RELATED APPLICATIONS

This application is a continuation of International Patent Application No. PCT/CN2018/081803, filed on Apr. 4, 2018, which claims priority to Chinese Patent Application No. 201710470680.7, filed on Jun. 20, 2017 and Chinese Patent Application No. 201710331440.9, filed on May 11, 2017. The disclosures of the aforementioned applications are hereby incorporated by reference in their entireties.

TECHNICAL FIELD

This application relates to the field of wireless communications technologies, and in particular, to a data buffering method and a session management function entity.

BACKGROUND

In a $4^{th}$ generation (4G) communications system, a packet data network gateway (PGW) may be used as an anchor for ensuring Internet Protocol (IP) continuity. As shown in FIG. 1, at a first moment T1, a terminal device obtains downlink data from a data network using a serving gateway (SGW) SGW1 and a PGW, to implement service data transceiving. If the terminal device enters an idle state at the SGW1, downlink data is buffered at the SGW1. At a second moment T2, after the terminal device is switched to a connected state, if the terminal device moves out of a service area of the SGW1 and selects an SGW2, the SGW2 needs to establish a forwarding tunnel with the SGW1, to obtain the downlink data buffered at the SGW1. In other words, a transmission path of the buffered downlink data is: SGW1→SGW2→terminal device. In addition, a transmission path of new downlink service data after the terminal device is switched to a connected state is: PGW→SGW2→terminal device.

In this way, there are two different data transmission paths, and consequently the downlink data received by the terminal device from these two different data transmission paths may be out of order. If the downlink data received by the terminal device is out of order, the terminal device needs to suspend processing, to adjust the received downlink data first. Consequently, user experience is severely affected (for example, video freeze may be caused in a video service).

To meet continuity requirements of different applications, a $5^{th}$ generation (5G) system supports different session and service continuity (SSC) modes: an SSC1 mode, an SSC2 mode, and an SSC3 mode. In the SSC1 mode, an anchor user plane function (UPF) entity of a session remains unchanged before service termination. In other words, an anchor IP address is unchanged before service termination. In the SSC2 mode, after the terminal device moves out of a service area of a source anchor UPF entity, a connection between the terminal device and the source anchor UPF entity is released. In the SSC3 mode, before the connection between the terminal device and the source anchor UPF entity is released, a new anchor UPF entity may be first selected for the terminal device to establish a new connection, and the connection between the terminal device and the source anchor UPF entity is released only after a specified time. In other words, the terminal device may be served using a plurality of IP addresses simultaneously.

In a movement process of the terminal device, an anchor UPF entity of a session having an SSC1 mode remains unchanged. After the session enters an inactive state at another UPF entity that is not an anchor UPF entity, which UPF entity buffers downlink data and how to ensure that downlink data subsequently received by the terminal device is not out of order become an urgent problem to be resolved.

SUMMARY

This application describes a data buffering method and a session management function entity.

According to an aspect, an embodiment of this application provides a data buffering method. The method includes: interacting, by a session management function entity, with a second user plane function entity and a first user plane function entity, such that the first user plane function entity sends first downlink data of a first session to an access network device via the second user plane function entity, where the first user plane function entity is an anchor of the first session; and notifying, by the session management function entity based on a preset condition, the first user plane function entity to buffer second downlink data of the first session, where the second downlink data is downlink data to be received by the first user plane function entity after the first session is switched to an inactive state.

Based on the foregoing data buffering solution, the session management function entity notifies, based on the preset condition, an anchor user plane function entity to buffer the second downlink data. In this way, after the first session is switched to an active state, a transmission path of the second downlink data buffered by the anchor user plane function entity and that of incoming third downlink data that is to be received after the first session is switched to an active state again are the same. Therefore, a problem that downlink data received by a terminal is out of order is avoided. In addition, buffered downlink data can be obtained without establishing an additional forwarding tunnel or releasing a forwarding tunnel again, such that signaling interaction between UPF entities is reduced. Therefore, delay is reduced, and user experience is improved.

In a possible design, the preset condition includes at least one of the following: SSC information indicates that the first session has a first session and service continuity SSC1 mode; mobility information indicates that a terminal device is a high mobility device; or the session management function entity and the first user plane function entity belong to a same operator network. The first session having an SSC1 mode indicates that a UPF used as a packet data unit (PDU) session anchor when a PDU session is initially established remains unchanged. In other words, in a movement process of the terminal device, an anchor UPF entity of the first session having the SSC1 mode remains unchanged. The session management function entity and the first user plane function entity belonging to a same operator network may include a non-roaming scenario or a local breakout (LBO) roaming scenario. In addition, mobility of the terminal device may further need to be considered during buffer device selection.

In a possible design, the method further includes: interacting, by the session management function entity, with a third user plane function entity and the first user plane function entity, such that the first user plane function entity sends the second downlink data and third downlink data to the access network device via the third user plane function entity, where the third downlink data is downlink data to be received by the first user plane function entity after the first session is switched to an active state.

In a possible design, notifying, by the session management function entity based on a preset condition, the first user plane function entity to buffer second downlink data of the first session includes: selecting, by the session management function entity based on the preset condition, the first user plane function entity as a user plane function entity to buffer the second downlink data; and notifying, by the session management function entity, the first user plane function entity to buffer the second downlink data after receiving the second downlink data.

In a possible design, the method further includes obtaining, by the session management function entity, mobility information of the terminal device. For example, the session management function entity may obtain the mobility information of the terminal device in the following manner: receiving, by the session management function entity, a mobility attribute from a mobility management function entity, where the mobility information is the mobility attribute; or obtaining, by the session management function entity, mobility statistics information, where the mobility information is the mobility statistics information; or receiving, by the session management function entity, a mobility attribute from a mobility management function entity, obtaining mobility statistics information, and determining the mobility information based on the mobility attribute and the mobility statistics information. The mobility attribute includes at least a high mobility attribute or a low mobility attribute, and the mobility statistics information is used to indicate a movement speed or a stay time of the terminal device.

For example, obtaining, by the session management function entity, mobility statistics information includes: receiving, by the session management function entity, the mobility statistics information from the mobility management function entity; or obtaining, by the session management function entity, the mobility statistics information from a network data analytics NWDA device.

In a possible design, after selecting, by the session management function entity, the first user plane function entity as a user plane function entity to buffer the second downlink data, the method further includes releasing, by the session management function entity, the second user plane function entity. Therefore, when the anchor user plane function entity is selected as a buffer device, the second user plane function entity may be directly released, such that network resources are saved.

In a possible design, the foregoing method is applicable to a home routed (HR) roaming scenario. The session management function entity and the third user plane function entity are located in a visited public land mobile network (VPLMN) in the HR roaming scenario. The method further includes adjusting, by the session management function entity, the buffer device, where the adjusted buffer device is used to buffer fourth downlink data of the first session after the first session is switched to an inactive state.

For example, adjusting, by the session management function entity, the buffer device includes: determining, by the session management function entity, the third user plane function entity as the buffer device; or determining, by the session management function entity, the session management function entity as the buffer device. Therefore, after the buffer device is updated, frequent interaction with the anchor user plane function entity in a home public land mobile network (HPLMN) can be avoided, thereby further improving user experience.

According to another aspect, this application further discloses a data buffering method. The method includes: interacting, by a session management function entity, with a second user plane function entity and a first user plane function entity, such that the first user plane function entity sends first downlink data of a first session to an access network device via the second user plane function entity, where the first user plane function entity is an anchor of the first session; notifying, by the session management function entity based on a preset condition, the second user plane function entity to buffer second downlink data of the first session, where the preset condition includes SSC information indicating that the first session has a third session and service continuity SSC3 mode, and where the second downlink data is downlink data to be received by the second user plane function entity after the first session is switched to an inactive state; and interacting, by the session management function entity, with a third user plane function entity and the second user plane function entity, such that the second user plane function entity sends the second downlink data to the access network device via the third user plane function entity, and the first user plane function entity sends third downlink data to the access network device via the second user plane function entity and the third user plane function entity, where the third downlink data is downlink data to be received by the first user plane function entity after the first session is switched to an active state.

The first session having an SSC3 mode indicates that there may be a plurality of anchor UPFs at a same moment in the SSC3 mode. In other words, there may be a plurality of "sessions" or a plurality of "session branches" of a session.

Based on the foregoing data buffering solution, a data path for transmitting the second downlink data and that for transmitting the third downlink data are the same starting from the second user plane function entity, such that a problem that downlink data received by a terminal is out of order is avoided, and user experience is improved. In addition, buffered downlink data can be obtained without establishing an additional forwarding tunnel or releasing a forwarding tunnel again, such that signaling interaction between UPF entities is reduced. Therefore, a delay is reduced, and user experience is further improved.

In a possible design, notifying, by the session management function entity based on a preset condition, the second user plane function entity to buffer second downlink data of the first session includes: selecting, by the session management function entity based on the preset condition, the second user plane function entity as a buffer device to buffer the second downlink data; and notifying, by the session management function entity, the second user plane function entity to buffer the second downlink data after receiving the second downlink data.

In a possible design, because the first session has the SSC3 mode, a buffer device that is used to buffer downlink data for a second session may be selected the to be same as or different from that of the first session. For example, for the second session, the session management function entity may select an initial anchor UPF or a current N3 UPF as a buffer device, and notify, using an N4 message, respective buffer devices of the first session and the second session to buffer received downlink data. Therefore, independent processing may be implemented for each session branch, such that processing between the session branches does not affect each other, and different requirements are met.

According to another aspect, an embodiment of this application provides a data buffering method. The method includes: interacting, by a session management function network element, with a second user plane function network element and a first user plane function network element, such that the first user plane function network element sends first downlink data of a first session via the second user plane function network element, where the second user plane function network element is a user plane function network element that is of the first session and is connected to an access network device, and the first user plane function network element is a user plane function network element connected to the second user plane function network element, for example, in some scenarios, the first user plane function network element is an anchor of the first session, and; when the first session enters an inactive state, releasing, by the session management function network element, the second user plane function network element (for example, determining, based on at least one of session and service continuity information, mobility information, and policy information, to release the second user plane function network element).

In a possible design, the session management function network element notifies the first user plane function network element to buffer second downlink data of the first session. In another possible design, after releasing the second user plane function network element, the session management function network element notifies the first user plane function network element to release a connection between the first user plane function network element and the second user plane function network element, such that the first user plane function network element "automatically" becomes a buffer device to buffer second downlink data after the first session is switched to an inactive state.

Based on the foregoing solution, after the session management function network element deletes the second user plane function network element, the first user plane function network element becomes a new user plane function network element connected to the access network device, and buffers the second downlink data. In this way, after the first session is subsequently switched to an active state, a transmission path of the second downlink data buffered by the first user plane function network element and that of incoming third downlink data that is to be received after the first session is switched to an active state again are the same. Therefore, a problem that downlink data received by a terminal is out of order is avoided. In addition, buffered downlink data can be obtained without establishing an additional forwarding tunnel or releasing a forwarding tunnel again, such that signaling interaction between UPF network elements is reduced. Therefore, a delay is reduced, and user experience is improved.

The first session entering an inactive state refers to a procedure in which the terminal device enters an idle state and a related transmission resource of the first session in an access network is released. Alternatively, the first session entering an inactive state refers to a procedure in which the terminal device is still in a connected state (e.g., Connection Management (CM)-Connected state) and a related transmission resource of the first session in an access network is released.

According to another aspect, an embodiment of this application provides a session management function entity, and the session management function entity has a function of implementing behavior of the session management function entity in the foregoing method. The function may be implemented by hardware, or may be implemented by executing corresponding software by hardware. The hardware or the software includes one or more modules corresponding to the function. In a possible design, a structure of the session management function entity includes a processor and a transceiver. The processor is configured to support the session management function entity in performing a corresponding function in the foregoing method. The transceiver is configured to implement communication between the session management function entity and the foregoing mobility management function entity/user plane function entity/another session management function entity. The session management function entity may further include a memory. The memory is configured to be coupled to the processor and store a program instruction and data that are necessary for the session management function entity.

According to still another aspect, an embodiment of this application provides a computer readable storage medium. The computer readable storage medium stores an instruction, and when the instruction is run on a computer, the computer is caused to perform the method in the foregoing aspects.

According to still another aspect, an embodiment of this application provides a computer program product, including an instruction. When the computer program product is run on a computer, the computer is caused to perform the method in the foregoing aspects.

BRIEF DESCRIPTION OF DRAWINGS

To describe the embodiments of this application more clearly, the following briefly describes the accompanying drawings required for describing the embodiments. The accompanying drawings in the following description show only some embodiments of this application, and a person of ordinary skill in the art may still derive other drawings from these accompanying drawings without creative efforts.

FIG. 3C;

FIG. 8D is a schematic diagram of a data path change of a session in FIG. 8A to FIG. 8C;

FIG. 9 is a flowchart of a data buffering method according to another embodiment of the present disclosure;

DESCRIPTION OF EMBODIMENTS

The following clearly describes the technical solutions in the embodiments of this application with reference to the accompanying drawings in the embodiments of this application.

Figure 1:
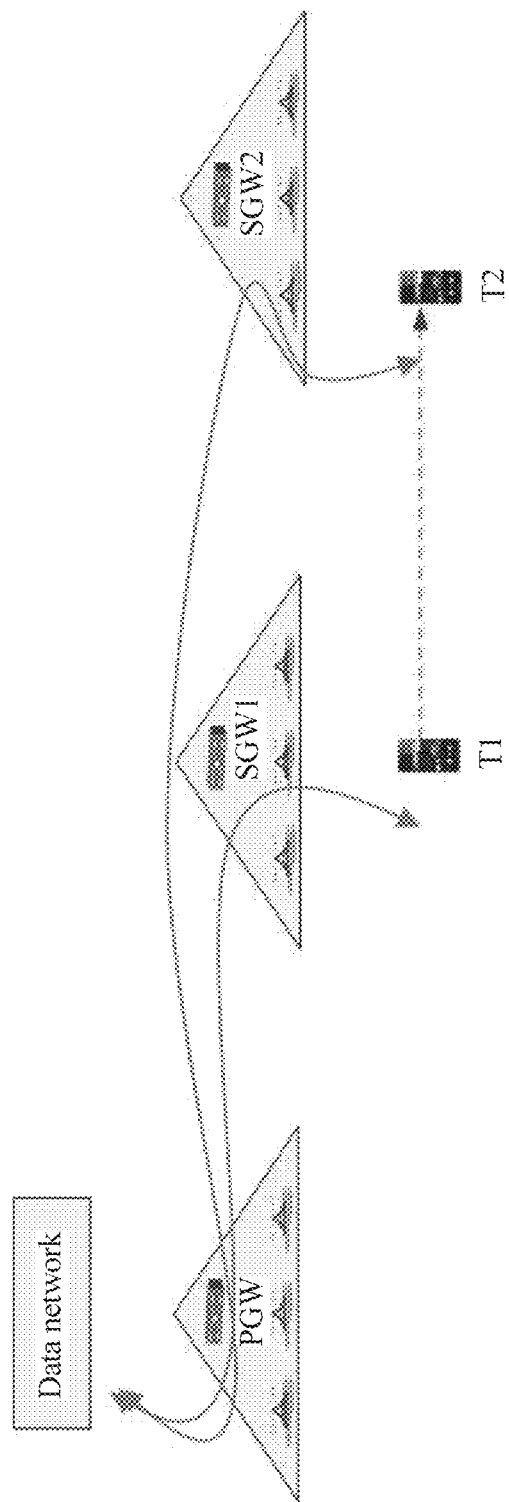
FIG. 1 is a schematic diagram of data buffering in other approaches.
Figure 2:
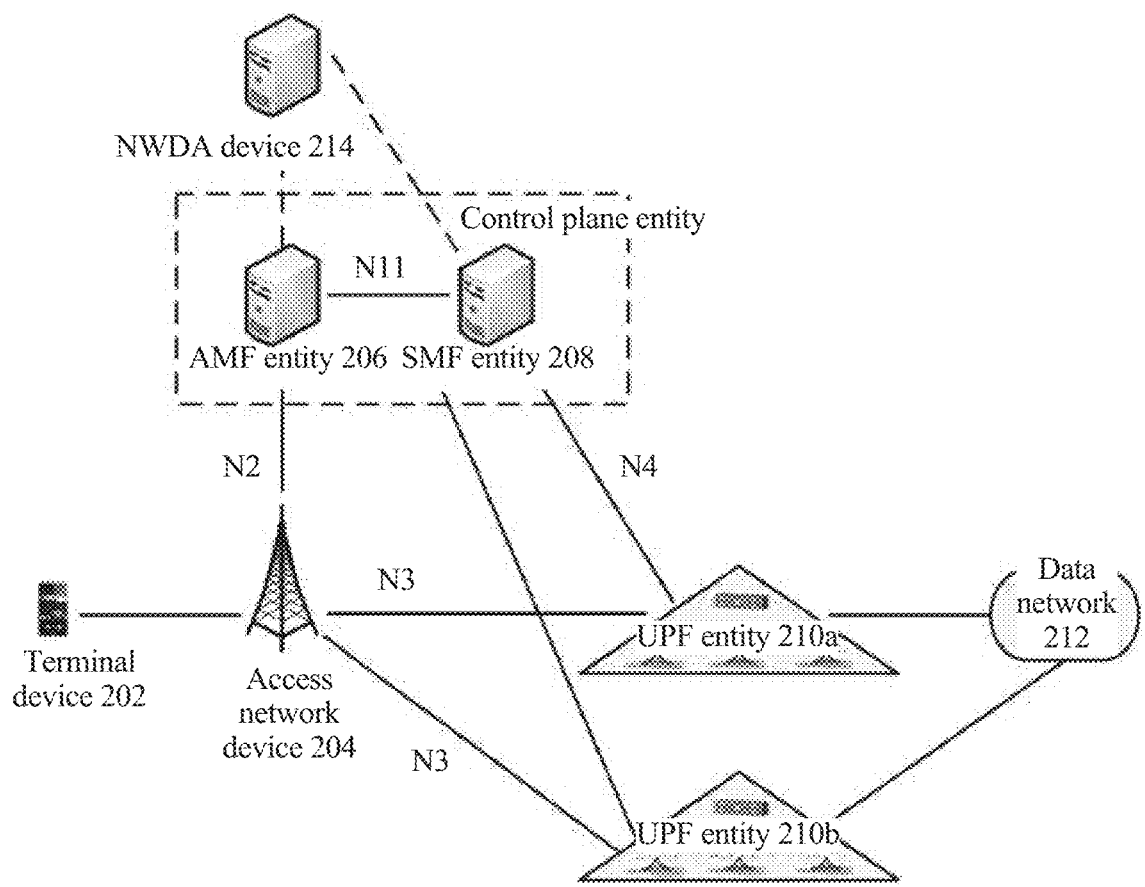
FIG. 2 is a schematic diagram of a communications system to which an embodiment of the present disclosure is applicable.

The embodiments of this application provide a solution based on the communications system shown in FIG. 2, and are applicable to buffering data in a next-generation mobile network (such as a 5G network) architecture. For example, in a 5G mobile network architecture, a control plane function and a forwarding plane function of a mobile gateway are decoupled, and the separated control plane function of the mobile gateway and a conventional control network element such as a Mobility Management Entity (MME) in the $3^{rd}$ Generation Partnership Project (3GPP) are combined to form a unified control plane entity. A user plane function (UPF) entity can implement serving gateway (SGW) and packet data network gateway (PGW) user plane functions (SGW-U and PGW-U). Further, the unified control plane entity may be decomposed into an access and mobility management function (AMF) entity and a session management function (SMF) entity. The AMF entity may be responsible for attachment, mobility management, a tracking area update procedure, and the like of a terminal device. The SMF entity may be responsible for session management of the terminal device, selection of a user plane device, reselection of a user plane device, Internet Protocol (IP) address allocation, quality of service (QoS) control, session establishment, modification and release, and the like.

In addition, the embodiments of this application are also applicable to other future-oriented communications technologies. System architectures and service scenarios described in the embodiments of this application are intended to describe the technical solutions in the embodiments of this application more clearly, but are not intended to limit the technical solutions provided in the embodiments of this application. A person of ordinary skill in the art may know that, as network architectures evolve and a new service scenario emerges, the technical solutions provided in the embodiments of this application are also applicable to a similar technical problem.

As shown in FIG. 2, an embodiment of this application provides a communications system. For example, the communications system includes a terminal device 202, an access network device 204, an AMF entity 206, an SMF entity 208, and user plane function (UPF) entities 210a and 210b. In addition, the AMF entity, the SMF entity, and the user plane function entity may also be respectively referred to as an AMF network element, an SMF network element, and a user plane network element.

The terminal device 202 in this embodiment of this application may include various handheld devices, in-vehicle devices, wearable devices, or computing devices that have a wireless communication function, or another processing device connected to a wireless modem. The terminal device may also be referred to as a user equipment (UE), a mobile station (MS), or a terminal, or the terminal device may include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or the like.

The access network device 204 in this embodiment of this application is an apparatus that is deployed in a wired or wireless access network and is used to provide a radio communication function for the terminal device 202. The access network device may include base stations in various forms, such as a macro base station, a micro base station (also referred to as a small cell), a relay station, or an access point. A device with a base station function may have different names in systems that use different radio access technologies. For example, in an Long-Term Evolution (LTE) system, the device is referred to as an evolved NodeB (eNB or eNodeB); or in a $3^{rd}$ generation (3G) system, the device is referred to as a NodeB or the like.

The AMF entity 206 in this embodiment of this application may be responsible for attachment, mobility management, a tracking area update procedure, and the like of the terminal device.

The SMF entity 208 in this embodiment of this application may be responsible for session management of the terminal device 202, selection of a user plane function entity (such as the user plane function entity 210a or 210b), reselection of a user plane function entity, IP address allocation, QoS control, and session establishment, modification, and release.

In the example of FIG. 2, two UPF entities are shown: the UPF entity 210a and the UPF entity 210b. Both the UPF entity 210a and the UPF entity 210b are connected to a data network (DN) 212, to implement service data transceiving in different service areas. The UPF entity 210b may further be connected to another access network device. No limitation is imposed in the present disclosure. In addition, another quantity of UPF entities may further be included in this embodiment of the present disclosure. No limitation is imposed in the present disclosure.

In a 5G communications system, a connection between the access network device 204 and the AMF entity 206 is an N2 connection, a connection between the access network device 204 and the UPF entity 210a (or 210b) is an N3 connection, a connection between the SMF entity 208 and the UPF entity 210a (or 210b) is an N4 connection, a connection between the AMF entity 206 and the SMF entity 208 is an N11 connection, a connection between SMF entities is an N16 connection, and a connection between UPF entities is an N9 connection. The "connection" may also be referred to as a point-to-point reference point or a reference point. In addition, the foregoing connections are not limited to the foregoing names, and may also have other names. In the following description, if a message is named as a connection, it indicates that the message is a message transmitted using the connection. For example, an "N2 message" indicates a message transmitted using the connection between the access network device 204 and the AMF entity 206. The "N2 message" may further have other specific names in different scenarios and procedures. No limitation is imposed in the present disclosure. The similar can be said for an "N3 message", an "N4 message", an "N11 message", and an "N16 message". Details are not further described herein.

Optionally, the communications system further includes a network data analytics (NWDA) device 214. The NWDA device 214 is used to collect statistics about mobility statistics information of the terminal device 202. For example, the mobility statistics information is used to indicate a movement speed of the terminal device 202 or a stay time of the terminal device 202 at a UPF entity.

In the following description, a "session" may be a packet data unit (PDU) session. A "data path of a session" is a data path for transmitting uplink or downlink data of the session between the terminal device 202 and a UPF, and may also be referred to as a "user plane path of a session".

Figure 3A:
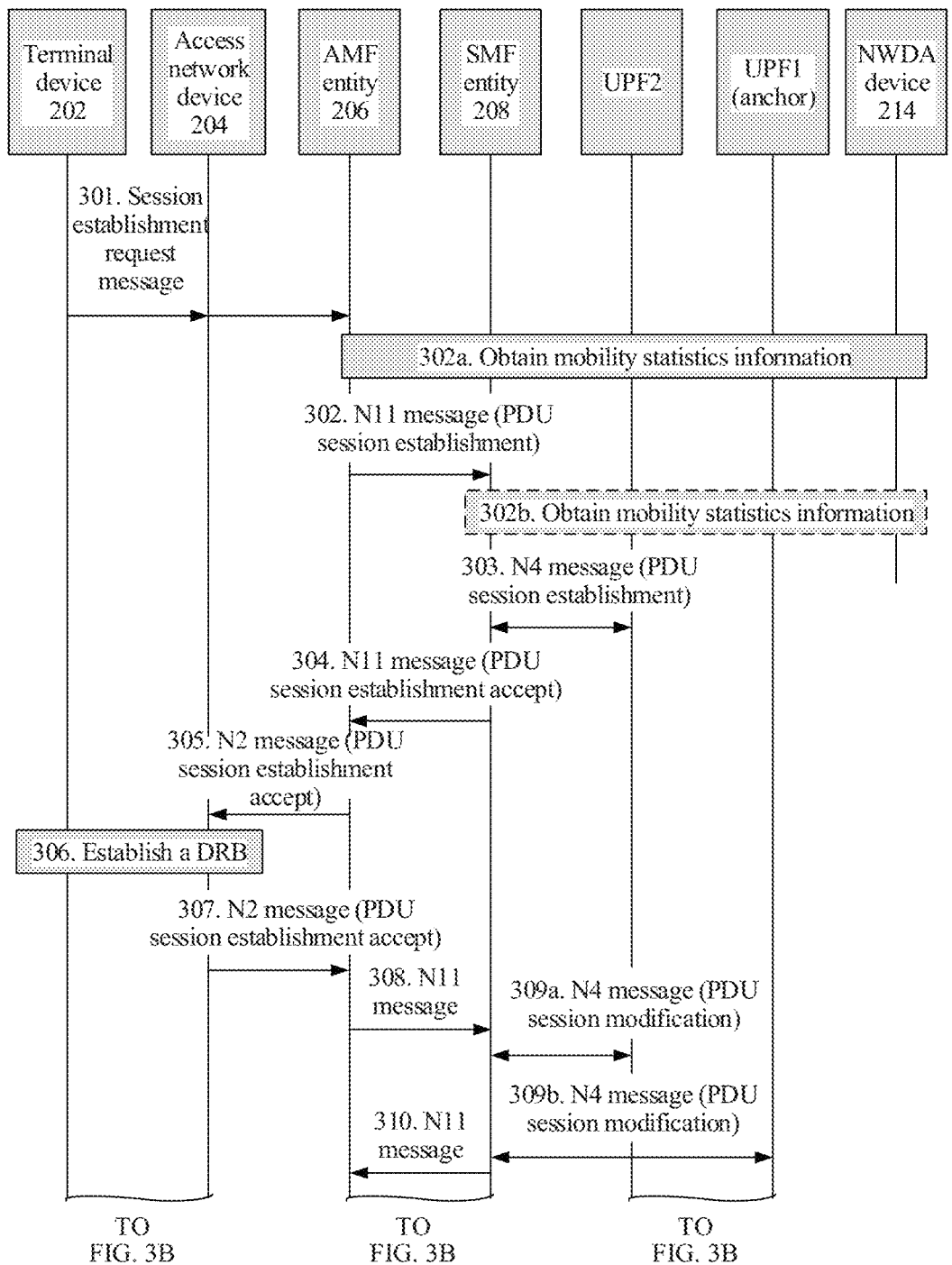
FIG. 3A, FIG. 3B, and FIG. 3C are signaling interaction diagrams of data buffering methods according to an embodiment of the present disclosure.
Figure 3B:
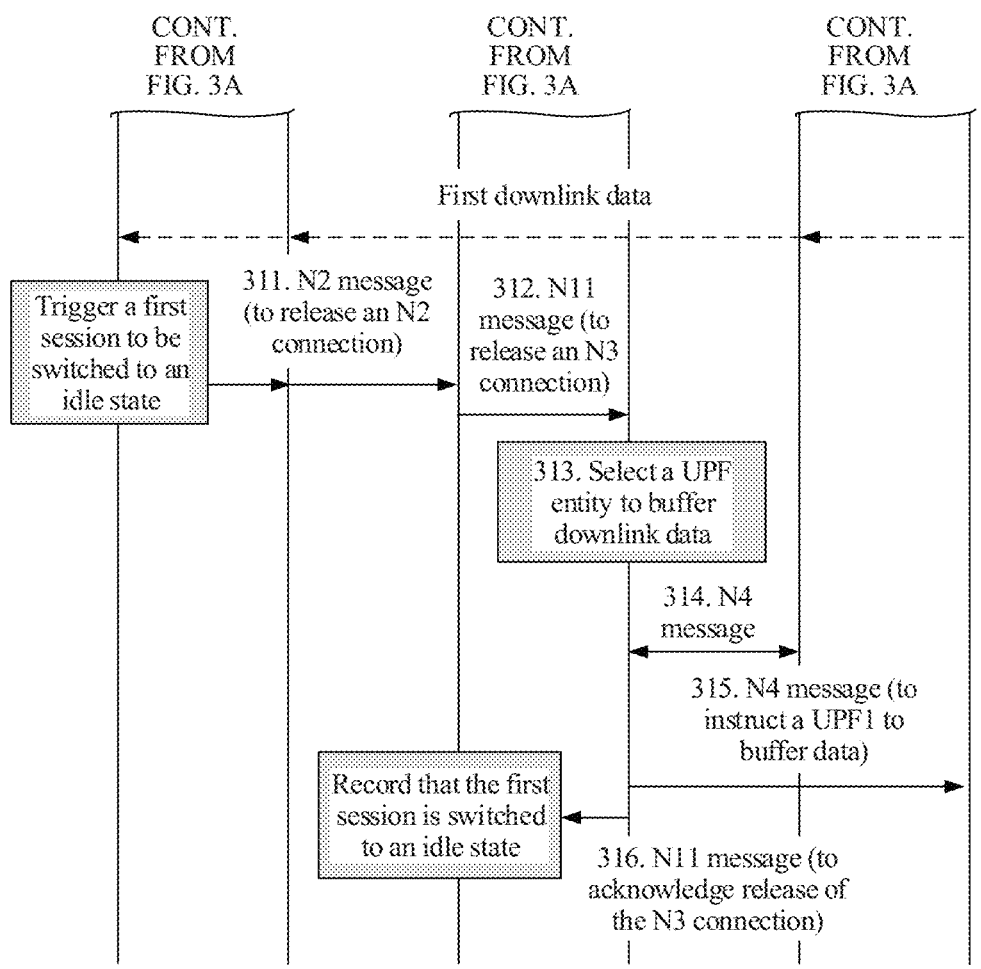
Figure 3C:
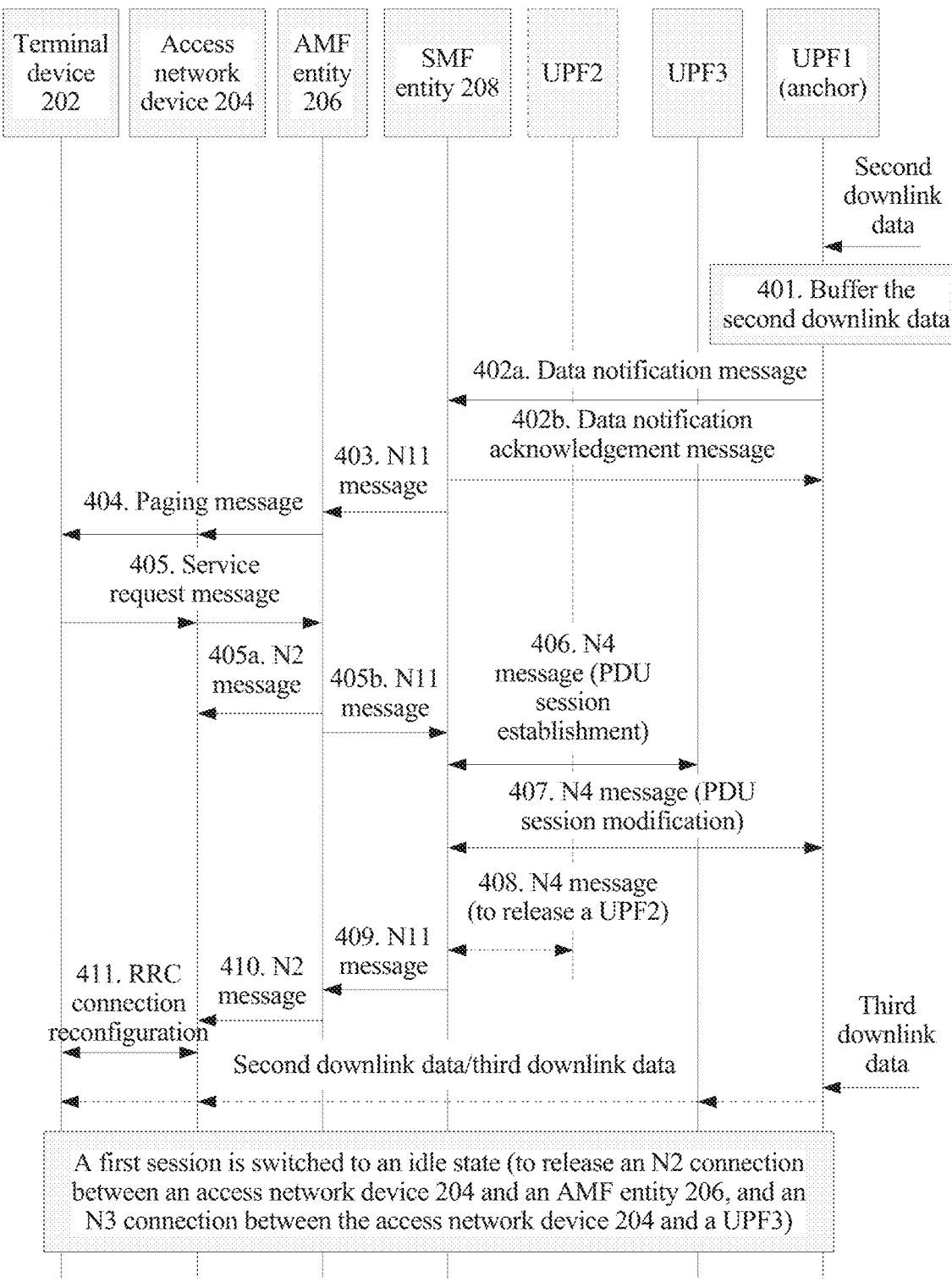
Figure 4:
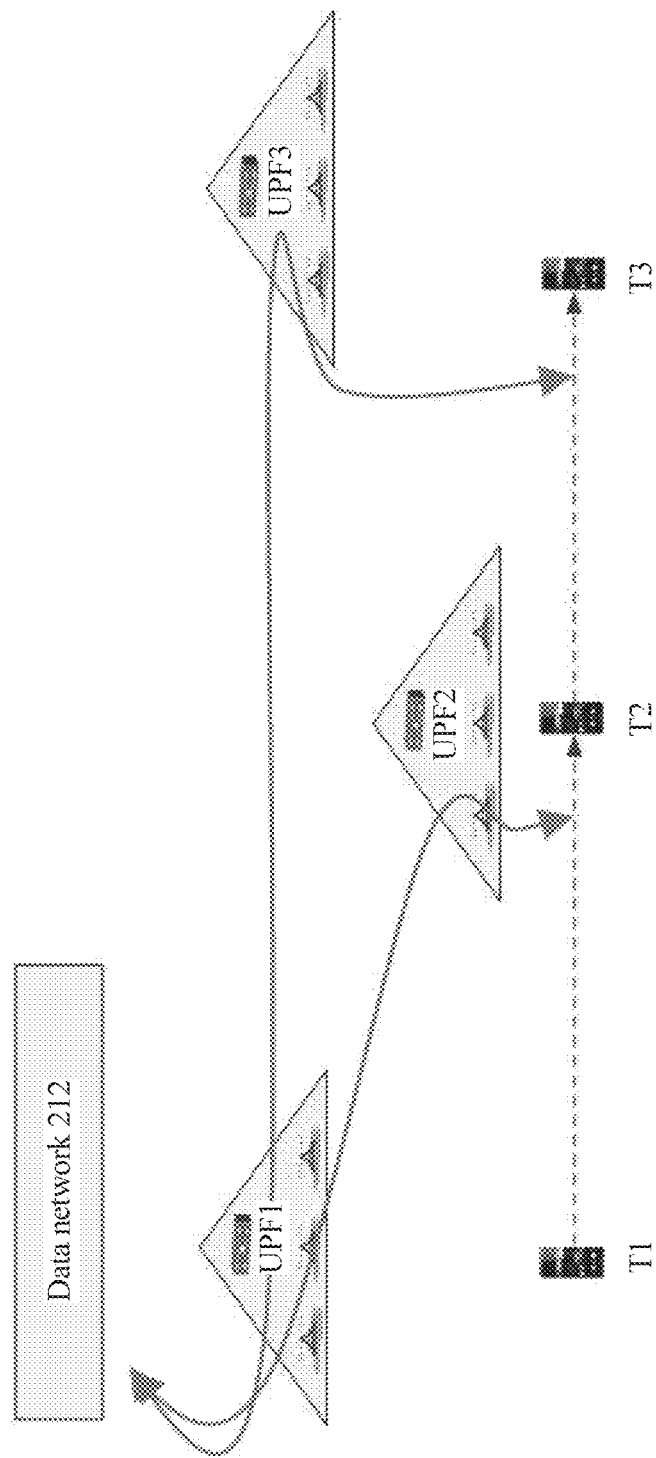
FIG. 4 is a schematic diagram of a data path change of a first session in FIG. 3A, FIG. 3B.

A data buffering method in an embodiment of this application is described below with reference to embodiments in FIG. 3A to FIG. 7. FIG. 3A and FIG. 3B and FIG. 3C are described with reference to FIG. 4. FIG. 4 shows a data path change of a first session in a movement process of a terminal device 202.

Before the steps shown in FIG. 3A and FIG. 3B are performed (for example, at a first moment T1 in FIG. 4), the terminal device 202 establishes the first session with a UPF1, and transmits service data to the UPF1 or receives service data from the UPF1. For example, the UPF1 is the UPF entity 210a in FIG. 2. The first session has a first session and service continuity (SSC1) mode, and the UPF1 is an anchor of the first session.

As shown in FIG. 3A, in step 301, the terminal device 202 sends a session establishment request message to an AMF entity 206 via an access network device 204. For example, when the terminal device 202 moves out of a service area of the UPF1, if a trigger condition of session establishment is met, the terminal device 202 sends the session establishment request message.

Optionally, the session establishment request message may carry SSC mode information of the first session.

Optionally, the session establishment request message may further carry public land mobile network (PLMN) information used to indicate a PLMN to which the terminal device 202 is subscribed. For example, the session establishment request message carries a subscriber permanent identifier (SUPI) of the terminal device 202, and the PLMN information may be represented using a field in the SUPI.

Step 302. The AMF entity 206 sends an N11 message to an SMF entity 208, where the N11 message may be used to establish a PDU session (the first session).

Optionally, the N11 message in step 302 may further carry the SSC mode information of the first session. For example, the SSC mode information is used to indicate that the first session has the SSC1 mode. After receiving the N11 message, the SMF entity 208 may learn that the first session has the SSC1 mode.

Optionally, the N11 message in step 302 may further carry the information about the PLMN to which the terminal device 202 is subscribed. After receiving the N11 message, the SMF entity 208 may further learn whether the terminal device 202 is currently located in a home public land mobile network (HPLMN), in other words, whether the terminal device 202 is in a non-roaming state. For example, the SMF entity 208 determines whether PLMN information of a current network is the same as the PLMN information obtained in step 302, to determine whether the terminal device 202 is currently located in the HPLMN.

Optionally, after receiving the N11 message from the AMF entity 206, the SMF entity 208 obtains mobility information of the terminal device 202. The mobility information is used to indicate whether the terminal device 202 is a high mobility device.

For example, the SMF entity 208 may obtain the mobility information of the terminal device 202 in the following implementation manners.

Implementation 1

Before step 302, the AMF entity 206 obtains mobility statistics information from an NWDA device 214 using step 302a. The N11 message in step 302 carries the obtained mobility statistics information. After receiving the N11 message from the AMF entity 206, the SMF entity 208 obtains the mobility information of the terminal device 202 based on the mobility statistics information. Alternatively, the N11 message in step 302 carries the mobility statistics information obtained from the NWDA device 214 and a mobility attribute of the terminal device 202 managed by the AMF entity 206. After receiving the N11 message from the AMF entity 206, the SMF entity 208 determines the mobility information of the terminal device 202 based on the mobility statistics information and the mobility attribute.

Implementation 2

The N11 message in step 302 carries a mobility attribute of the terminal device 202 managed by the AMF entity 206. After receiving the N11 message from the AMF entity 206, the SMF entity 208 obtains mobility statistics information from an NWDA device 214 using step 302b. Finally, the SMF entity 208 determines the mobility information of the terminal device 202 based on the mobility statistics information and the mobility attribute.

Implementation 3

After receiving the N11 message from the AMF entity 206, the SMF entity 208 obtains mobility statistics information from an NWDA device 214 using step 302b. The SMF entity 208 obtains the mobility information of the terminal device 202 based on the mobility statistics information.

Implementation 4

The N11 message in step 302 carries a mobility attribute of the terminal device 202 managed by the AMF entity 206. After receiving the N11 message from the AMF entity 206, the SMF entity 208 obtains the mobility information of the terminal device 202 based on the mobility attribute.

In the foregoing implementations, the mobility attribute includes at least first-type mobility (such as high mobility) or second-type mobility (such as low mobility). Optionally, the mobility attribute may further include third-type mobility (such as medium mobility). For example, the mobility attribute may be a parameter in a mobility pattern, or may be a parameter independent of a mobility pattern. The mobility attribute may be configured by the AMF entity 206, or may be obtained by the AMF entity 206 from another network device. No limitation is imposed in the present disclosure.

The mobility statistics information may include at least one of a movement speed of the terminal device 202 or a stay time of the terminal device 202 at a UPF entity. It should be noted that the movement speed herein may be generated through statistics collection based on an instantaneous speed value of the terminal device 202 at each moment within a preset time period. Similarly, the stay time may also be generated through statistics collection.

For example, in the foregoing Implementations 1, 2, or 3, the SMF entity 208 may obtain the mobility information of the terminal device 202 based on the mobility statistics information according to the following: If the mobility statistics information indicates that the movement speed of the terminal device 202 is higher than a first threshold or the stay time of the terminal device 202 at a UPF entity is not greater than a second threshold, the determined mobility information indicates that the terminal device 202 is a high mobility device; or if the mobility statistics information indicates that the movement speed of the terminal device 202 is not greater than a first threshold or the stay time of the terminal device 202 at a UPF entity is greater than a second threshold, the determined mobility information indicates that the terminal device 202 is not a high mobility device.

In the foregoing Implementation 4, the SMF entity 208 may obtain the mobility information of the terminal device 202 based on the mobility attribute according to the following: If the mobility attribute is the first-type mobility (such as high mobility), the determined mobility information indicates that the terminal device 202 is a high mobility device; or if the mobility attribute is the second-type mobility (such as low mobility) or the third-type mobility (such as medium mobility), the determined mobility information indicates that the terminal device 202 is not a high mobility device.

In the foregoing Implementations 1 or 2, that the SMF entity 208 may determine the mobility information of the terminal device 202 based on the mobility statistics information and the mobility attribute according to the following: If the mobility statistics information indicates that the movement speed of the terminal device 202 is higher than a first threshold or the stay time of the terminal device 202 at a UPF entity is not greater than a second threshold, and the mobility attribute is the first-type mobility (such as high mobility), the determined mobility information indicates that the terminal device 202 is a high mobility device; or if the mobility statistics information indicates that the movement speed of the terminal device 202 is not greater than a first threshold or the stay time of the terminal device 202 at a UPF entity is greater than a second threshold, and the mobility attribute is the second-type mobility (such as low mobility) or the third-type mobility (such as medium mobility), the determined mobility information indicates that the terminal device 202 is not a high mobility device; or if the mobility statistics information and the mobility attribute conflict with each other, the SMF entity 208 may further determine, based on a local policy, whether the terminal device 202 is a high mobility device.

Step 303. The SMF entity 208 selects a UPF2 (such as the UPF entity 210b in FIG. 2), and exchanges an N4 message with the UPF2, to establish the PDU session (the first session). For example, the SMF entity 208 sends an N4 session establishment request message to the UPF2, and the UPF2 returns an N4 session establishment response message to the SMF entity 208.

The UPF2 is connected to the UPF1. For example, the UPF2 is connected to the UPF1 using an N9 connection.

Step 304. The SMF entity 208 returns an N11 message to the AMF entity 206. The N11 message is a PDU session establishment accept message. For example, the PDU session establishment accept message in step 304 carries tunnel information on a core network side (such as address information of the UPF2).

Step 305. The AMF entity 206 sends an N2 message to the access network device 204, to forward the PDU session establishment accept message in step 304 to the access network device 204. The N2 message is used to activate an N3 connection between the access network device 204 and the UPF2 for the first session.

Step 306. After receiving the N2 message, the access network device 204 establishes a data radio bearer (DRB).

Step 307. The access network device 204 returns an N2 message to the AMF entity. The N2 message is a PDU session establishment accept message. For example, the PDU session establishment accept message in step 307 carries tunnel information on an access network side.

Step 308. The AMF entity 206 sends an N11 message to the SMF entity 208, to forward the PDU session establishment accept message in step 307 to the SMF entity 208.

Step 309a. The SMF entity 208 exchanges an N4 message with the UPF2, to forward the tunnel information on the access network side to the UPF2 through PDU session modification. For example, the SMF entity 208 sends an N4 session modification request message to the UPF2, and the UPF2 returns an N4 session modification response message to the SMF entity 208.

Step 309a. The SMF entity 208 exchanges an N4 message with the UPF1, to add the UPF2 to a data path of the first session of the UPF1 through PDU session modification. For example, the SMF entity 208 sends an N4 session modification request message to the UPF1, and the UPF1 returns an N4 session modification response message to the SMF entity 208.

Step 310. The SMF entity 208 returns an N11 message to the AMF entity 206 as a response to the N11 message in step 308.

In this way, the UPF1 sends first downlink data of the first session to an access network device (such as the access network device 204) via the UPF2. As shown in FIG. 4, at a second moment T2, a downlink data path of the first session is: UPF1→UPF2→access network device (not shown in the figure)→terminal device 202. Similarly, an uplink data path of the first session is: terminal device 202→access network device (not shown in the figure)→UPF2→UPF1.

In this case, the UPF2 is used as a UPF entity connected to the access network device 204, and may also be referred to as an N3 UPF. The N3 UPF is used to terminate an N3 connection, and may also be referred to as an N3 connection termination point. In the following description, a UPF entity connected to the access network device 204 is referred to as an N3 UPF for short. Certainly, the UPF entity connected to the access network device 204 may also have another name. No limitation is imposed in the present disclosure.

Step 311. When a trigger condition is met, the first session is triggered to be switched to an inactive state. In this case, the terminal device 202 sends a trigger message to the access network device 204. After receiving the trigger message, the access network device 204 sends an N2 message to the AMF entity 206, to release an N2 connection between the access network device 204 and the AMF entity 206.

It should be noted that in the foregoing description, the first session is triggered to be switched to an inactive state. If all sessions of the terminal device 202 are switched to an inactive state, the terminal device 202 is correspondingly switched to an idle (CM-IDLE) state.

Step 312. The AMF entity 206 sends an N11 message to the SMF entity 208, to request to release the N3 connection between the access network device 204 and the UPF2.

Optionally, if the AMF entity 206 detects that the mobility statistics information or the mobility attribute of the terminal device 202 changes, the N11 message may carry at least one of the mobility statistics information and the mobility attribute. After receiving the N11 message from the AMF entity 206, the SMF entity 208 may update the mobility information of the terminal device 202. For a manner in which the SMF entity 208 updates the mobility information of the terminal device 202, refer to description about how the SMF entity 208 obtains the mobility information of the terminal device 202 in step 302. Details are not described herein again.

Step 313. The SMF entity 208 selects, based on a preset condition, the UPF1 as a buffer device to buffer second downlink data after the first session is switched to an inactive state.

For example, the preset condition includes at least one of the following: the SSC information indicates that the first session has the SSC1 mode; the mobility information of the terminal device 202 indicates that the terminal device 202 is a high mobility device; or the session management function entity and the first user plane function entity belong to a same operator network (for example, a non-roaming scenario or a local breakout (LBO) roaming scenario).

In other words, when any one of the preset conditions is met, the UPF1 may be selected as a buffer device to buffer the second downlink data after the first session is switched to an inactive state.

For example, if the SSC information indicates that the first session has the SSC1 mode, the SMF entity 208 selects the UPF1 to buffer the second downlink data. Alternatively, if the mobility information of the terminal device indicates that the terminal device 202 is a high mobility device, the SMF entity 208 selects the UPF1 to buffer the second downlink data. Alternatively, if the SSC information indicates that the first session has the SSC1 mode and the mobility information of the terminal device indicates that the terminal device 202 is a high mobility device, the SMF entity 208 selects the UPF1 to buffer the second downlink data. In addition, the foregoing method is applicable to the non-roaming scenario, and is also applicable to the LBO roaming scenario. When the foregoing method is applicable to the LBO roaming scenario, the SMF entity 208 is located in a visited PLMN (VPLMN).

Step 314. The SMF entity 208 exchanges an N4 message with the UPF2, to request to release the N3 connection between the access network device 204 and the UPF2. For example, the SMF entity 208 sends an N3 connection release request message or a session modification request message to the UPF2, and the UPF2 returns an N3 connection release response message or a session modification response message to the SMF entity 208, to release the N3 connection between the access network device 204 and the UPF2.

Alternatively, the SMF entity 208 exchanges an N4 message with the UPF2, to request to release the UPF2. For example, the SMF entity 208 sends a session termination request message to the UPF2, and the UPF2 returns a session termination response message to the SMF entity 208, to directly release the UPF2. It should be noted that "releasing a UPF" means releasing specified/all sessions on the UPF, in other words, deleting related information of specified/all sessions on the UPF, and may also be expressed as "deleting a UPF". The similar can be said for the following similar description.

Step 315. The SMF entity 208 sends an N4 message to the UPF1, to notify the UPF1 to buffer the second downlink data. For example, the SMF entity 208 sends an N4 session modification request message to the UPF1 through PDU session modification, to notify the UPF1 to buffer the second downlink data, and the UPF1 returns an N4 session modification response message to the SMF entity 208.

Alternatively, the foregoing steps 313 to 315 may be replaced with the following steps: The SMF entity 208 releases the UPF2, and sends an N4 message to the UPF1, to notify the UPF1 to release a connection between the UPF1 and the UPF2.

For example, the SMF entity 208 first determines, based on policy information, whether to release the UPF2. When the policy information indicates to release the UPF2, the SMF entity 208 determines to release the UPF2. For example, an operator sets whether a user plane management policy is to delete the N3 UPF for all sessions or to delete the N3 UPF for specified sessions, and therefore generates corresponding policy information. Alternatively, the SMF entity 208 may determine, based on another parameter in the foregoing preset condition (such as the session and service continuity information or the mobility information), whether to release the UPF2. For details, refer to description about how the SMF entity 208 selects the UPF1 as a buffer device based on the preset condition. Details are not described again. In other words, when any one of the foregoing conditions is met, the SMF entity 208 determines to release the UPF2.

After determining to release the UPF2, the SMF entity 208 exchanges an N4 message with the UPF2, to request to release the UPF2. For example, the SMF entity 208 sends a session termination request message to the UPF2, and the UPF2 returns a session termination response message to the SMF entity 208, to directly release the UPF2.

In addition, the SMF entity 208 exchanges the N4 message with the UPF1, to request the UPF1 to release the connection between the UPF1 and the UPF2. For example, the SMF entity 208 sends a session modification request message to the UPF1, and the UPF1 returns a session modification response message to the SMF entity 208. In an implementation, the SMF entity 208 may add explicit indication information (such as buffering on/off) into the session modification request, to notify the UPF1 to buffer second downlink data after receiving the second downlink data. In another implementation, the session modification request may carry no indication, and no explicit indication information is carried in the session modification request message, to implicitly notify the UPF1 to buffer second downlink data after receiving the second downlink data. In other words, the SMF entity 208 notifies the UPF1 to release the connection between the UPF1 and the UPF2, such that the UPF1 "automatically" becomes a buffer device to buffer the second downlink data after the first session is switched to an inactive state.

It may be understood that after the UPF2 is released, the UPF1 becomes a new N3 UPF, and the UPF1 becomes a buffer device to buffer the second downlink data after the first session is switched to an inactive state. It should be noted that the UPF1 may be an anchor UPF, or may be a UPF between an anchor UPF and the UPF2.

Step 316. The SMF entity 208 returns an N11 message to the AMF entity 206, to acknowledge release of the N3 connection between the access network device 204 and the UPF2, and after receiving the N11 message, the AMF entity 206 records that the first session is switched to an inactive state.

Based on the foregoing steps in FIG. 3A and FIG. 3B, after selecting the UPF1 based on the preset condition or deleting the UPF2 based on the preset condition, the SMF entity notifies the anchor UPF1 to buffer the second downlink data. After the first session is switched to an active state, both a transmission path of the second downlink data buffered by the anchor user plane function entity and that of incoming third downlink data that is to be received after the first session is switched to an active state again are: UPF1→UPF3→access network device→terminal device 202. Therefore, a problem that downlink data received by a terminal is out of order is avoided. In addition, buffered downlink data can be obtained without establishing an additional forwarding tunnel or releasing the established forwarding tunnel, such that signaling interaction between UPF entities is reduced. Therefore, a delay is reduced, and user experience is improved. This is described in detail with reference to FIG. 3C and FIG. 4.

In addition, mobility of the terminal device 202 further needs to be considered during buffer device selection, and the anchor user plane function entity is selected as a buffer device only when the terminal device 202 is a high mobility device (which may cause a relatively high probability of out-of-order and forwarding path re-establishment). Similarly, the mobility of the terminal device 202 may also need to be considered when the SMF entity 208 determines whether to delete the N3 UPF connected to the access network device, and the SMF entity 208 chooses to delete the N3 UPF only when the terminal device 202 is a high mobility device (which may cause a relatively high probability of out-of-order and forwarding path re-establishment), and sets, as a buffer device, another UPF connected to the N3 UPF using an N9 interface (such as the anchor user plane function entity). In addition, the UPF connected to the N3 UPF using the N9 interface may also be a UPF located between the anchor user plane function entity and the N3 UPF.

Optionally, if the mobility information of the terminal device 202 indicates that the terminal device 202 is not a high mobility device (which may cause a relatively low probability of out-of-order and forwarding path re-establishment), the SMF entity 208 may select another buffer device (for example, the buffer device is the UPF2, namely, a UPF providing an N3 connection), or choose not to delete the N3 UPF (such as the UPF2) but directly set the N3 UPF as a buffer device. In this way, the data path of the first session is still: UPF1→UPF2→access network device→terminal device 202. After making a paging response, the terminal device 202 may directly obtain buffered downlink data from the UPF2 connected to the access network device. When a probability that the terminal device 202 moves out a service area of the UPF2 is relatively low (a probability of out-of-order and forwarding path re-establishment is relatively low), the terminal device 202 may obtain the buffered downlink data using a shorter path, such that signaling resources are saved.

Optionally, the SMF entity 208 may also select the SMF entity 208 as a buffer device. For example, if the UPF does not have a capability of buffering downlink data, the SMF entity 208 may select the SMF entity 208 as a buffer device. Alternatively, the SMF entity 208 may select the SMF entity 208 as a buffer device based on a policy.

As shown in FIG. 3C, when a first session is in an inactive state, second downlink data from a data network 212 arrives at a UPF1.

Step 401. The UPF1 buffers the second downlink data.

Step 402*a*. After receiving the second downlink data, the UPF1 sends a data notification message to an SMF entity 208.

An execution sequence of step 401 and step 402*a* is not limited in the present disclosure. Step 402*a* may be performed after step 401, or step 401 may be performed after step 402*a*, or step 401 and step 402*a* are performed simultaneously.

Optionally, in step 402*b*, the SMF entity 208 returns a data notification acknowledgement message to the UPF1.

Step 403. After receiving the data notification message, the SMF entity 208 determines an AMF entity 206, and sends an N11 message to the AMF entity 206.

Step 404. The AMF entity 206 sends a paging message to a terminal device 202 via an access network device 204, to trigger the terminal device 202 to be switched to a connected state.

After receiving the paging message, the terminal device 202 executes a service request procedure using steps 405 to 411.

Step 405. The terminal device 202 sends a service request message to the access network device 204, and after receiving the service request message, the access network device 204 forwards the service request message using an N2 message.

Optionally, in step 405*a*, the AMF entity 206 sends an N2 message to the access network device 204. The N2 message carries address information of a UPF2. Because the UPF2 or an N3 connection between the access network device 204 and the UPF2 is released using step 314, the message is invalid, and therefore may also be omitted.

Step 405*b*. The AMF entity 206 sends an N11 message to the SMF entity 208.

Step 406. After receiving the N11 message, the SMF entity 208 selects a UPF3 (not shown in FIG. 2), and exchanges an N4 message with the UPF3, to establish a PDU session (the first session). For example, the SMF entity 208 sends an N4 session establishment request message to the UPF3, and the UPF3 returns an N4 session establishment response message to the SMF entity 208.

Step 407. The SMF entity 208 exchanges an N4 message with the UPF1, to add the UPF3 to a data path of the first session of the UPF1 through PDU session modification. For example, the SMF entity 208 sends an N4 session modification request message to the UPF1, and the UPF1 returns an N4 session modification response message to the SMF entity 208.

Optionally, if only the N3 connection between the access network device 204 and the UPF2 is released and the UPF2 is not released in step 314 in FIG. 3B, step 408 may be performed. If the UPF2 has been released in step 314 in FIG. 3B, step 408 may be omitted.

Step 408. The SMF entity 208 exchanges an N4 message with the UPF2, to release the UPF2. For example, the SMF entity 208 sends a session termination request message to the UPF2, to release the UPF2, and the UPF2 returns a session termination response message to the SMF entity 208.

Step 409. After receiving the session establishment response message and the session modification response message, the SMF entity 208 sends an N11 message to the AMF entity 206.

Step 410. The AMF entity 206 sends an N2 message to the access network device 204. The N2 message indicates service accept. The N2 message carries address information of the UPF3.

Step 411. After receiving the N2 message, the access network device 204 interacts with the terminal device 202, to perform RRC connection reconfiguration.

In this way, the UPF3 is an N3 UPF. The UPF1 sends the buffered second downlink data and received new third downlink data to the access network device 204 via the UPF3. As shown in FIG. 4, at a third moment T3, data paths that are used to transmit the second downlink data and the third downlink data of the first session are: UPF1→UPF3→access network device (not shown in the figure)→terminal device 202. Therefore, the data path for transmitting the second downlink data is the same as that for transmitting the third downlink data, such that a problem that downlink data received by a terminal is out of order is avoided, and user experience is improved. In addition, buffered downlink data can be obtained without establishing an additional forwarding tunnel or releasing the established forwarding tunnel, such that signaling interaction between UPF entities is reduced. Therefore, a delay is reduced, and user experience is further improved.

When a trigger condition is met, the first session may be triggered again to be switched to an inactive state. For the process, refer to descriptions in steps 311 to 316 in FIG. 3B. Details are not described herein again. Similarly, in this process, an N2 connection between the access network device 204 and the AMF entity 206 is released, and an N3 connection between the access network device 204 and the UPF3 is released (or the UPF3 is directly released).

If a terminal moves out of a service area of a source SMF entity 208 in a movement process, SMF entity reallocation needs to be performed. For example, the foregoing UPF1 and UPF2 are connected to the SMF entity 208, but the foregoing UPF3 is connected to an SMF entity 208'.

Figure 5A:
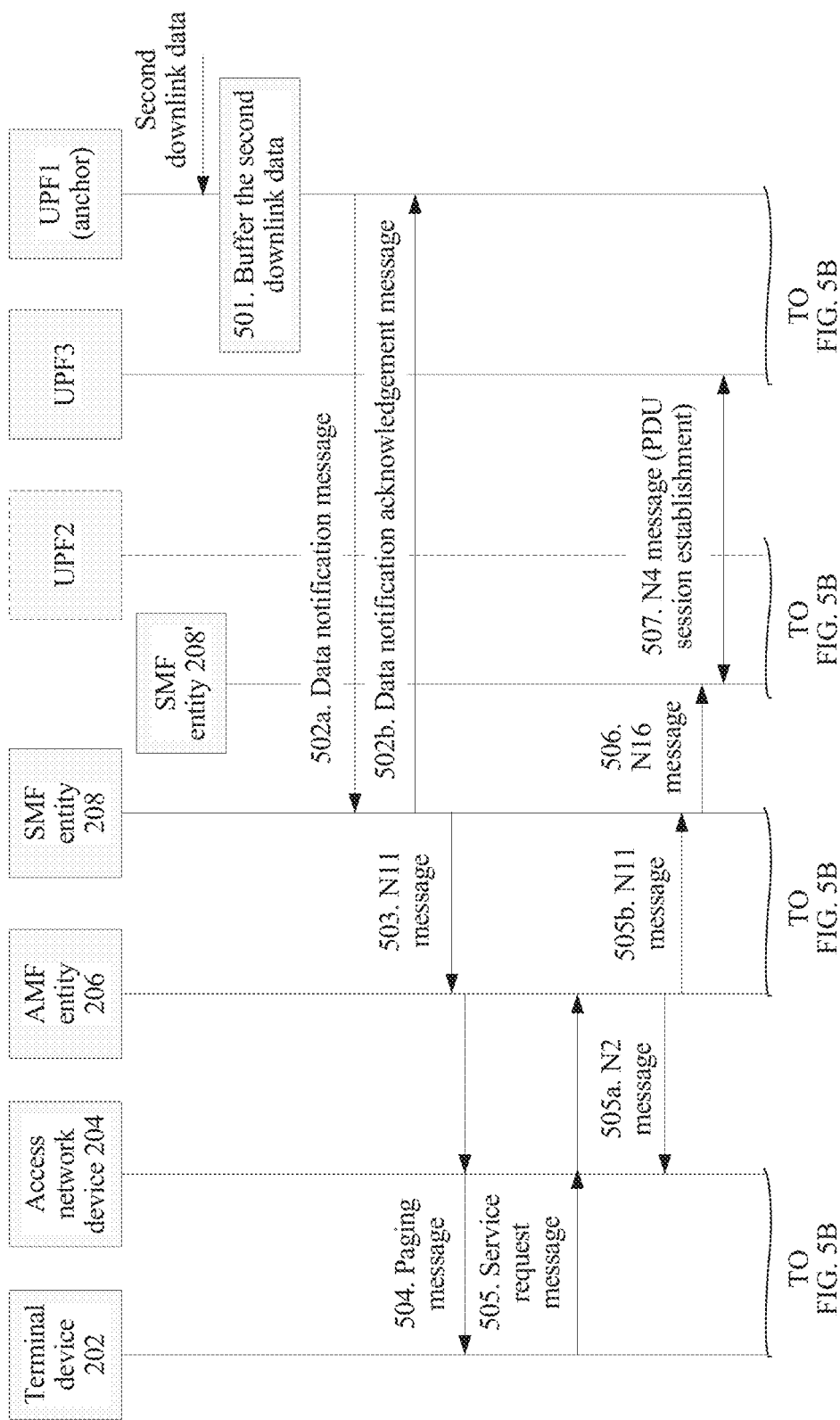
FIG. 5A and FIG. 5B are other signaling interaction diagrams of a data buffering method according to an embodiment of the present disclosure.
Figure 5B:
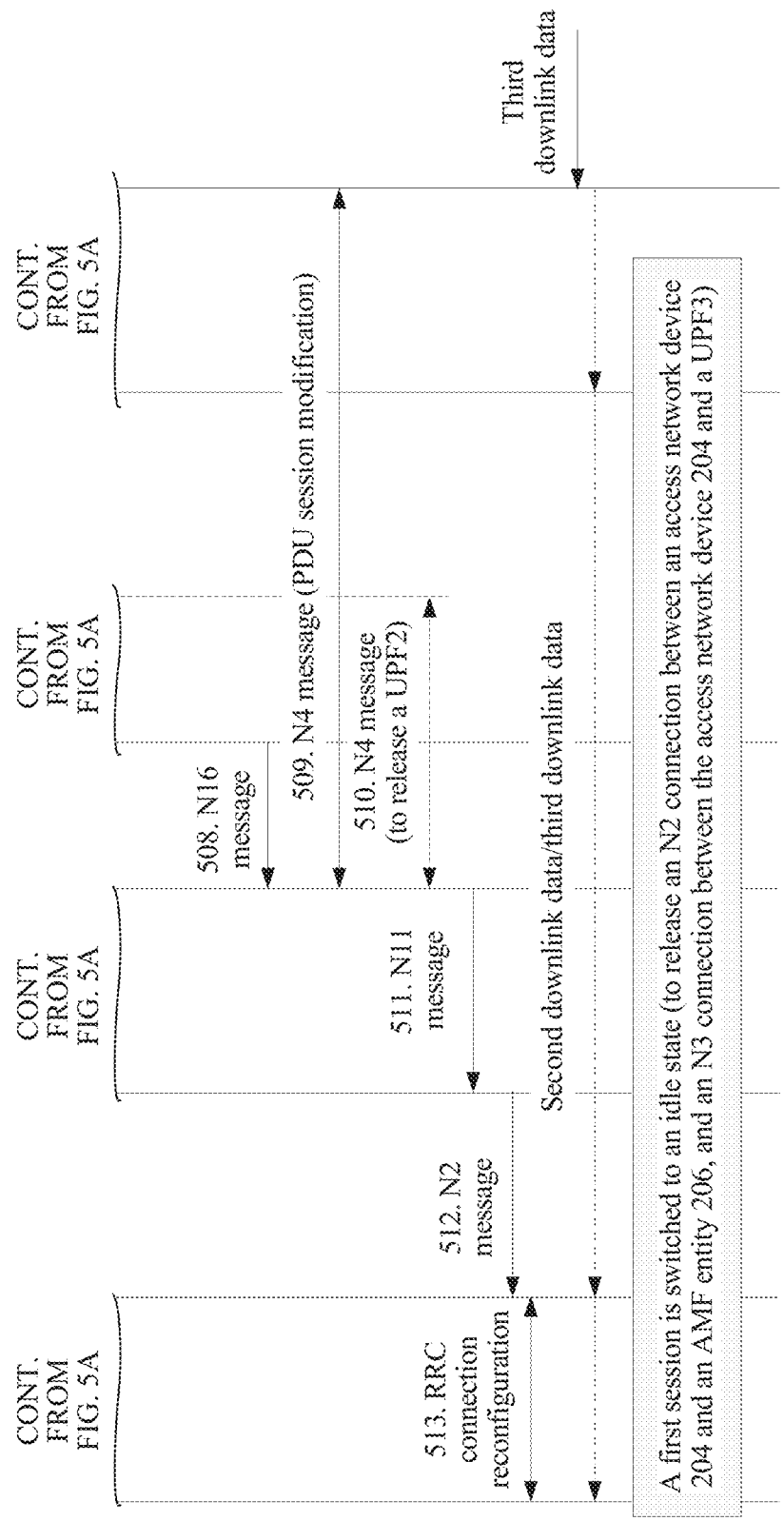

As shown in FIG. 5A, for steps 501 to 505b, refer to descriptions in steps 401 to 405b in FIG. 3C. Details are not described herein again.

Step 506. The SMF entity 208 sends an N16 message to the SMF entity 208'.

Step 507. After receiving the N16 message, the SMF entity 208' selects the UPF3, and interacts with the UPF3, to establish a PDU session.

Step 508. The SMF entity 208' returns an N16 message to the SMF entity 208.

For steps 509 to 513, refer to descriptions in steps 407 to 411 in FIG. 3C. Details are not described herein again.

Similarly, when a trigger condition is met, a first session may be triggered again to be switched to an inactive state. For the process, refer to descriptions in steps 311 to 316 in FIG. 3B. Details are not described herein again. In this process, an N2 connection between the access network device 204 and the AMF entity 206 is released. In addition, after the SMF is relocated to the SMF entity 208', a receive end of the N11 message in step 312 is the SMF entity 208' (or the N11 message is forwarded to the SMF entity 208' via the SMF entity 208). The SMF entity 208' interacts with the UPF3 to release the UPF3 or an N3 connection between the access network device 204 and the UPF3.

In addition, for a session involved with a plurality of SMF entities, an N3 UPF managed by an SMF that recently serves the terminal device 202 may be set (or updated) as a buffer device, or an N3 UPF managed by an SMF that recently serves the terminal device 202 is not deleted.

In addition, the foregoing method in the present disclosure may further be used in a roaming scenario. For example, the roaming scenario includes a LBO scenario or a home routed (HR) scenario.

The LBO roaming scenario is described with reference to FIG. 3A and FIG. 3B, FIG. 3C, and FIG. 4.

For example, at an initial moment, a terminal device 202 obtains service data using a UPF0 (not shown in the figure) in an HPLMN. At a first moment T1, the terminal device 202 roams from the HPLMN to a VPLMN, and the terminal device 202 establishes a first session with a UPF1 in the VPLMN, and transmits the service data using the UPF1. The UPF1 is an anchor of the first session in the VPLMN.

Subsequently, after the terminal device 202 moves from a service area of the UPF1 to a service area of a UPF2 in the VPLMN, the terminal device 202 may establish the first session with the UPF2 (for example, at a second moment T2) using steps 301 to 310 in FIG. 3A. It should be noted that an SMF entity 208 at this moment is an SMF entity located in the VPLMN. In a procedure in which the first session is switched to an inactive state, for example, after the UPF1 is selected based on a preset condition or the UPF2 is deleted based on a preset condition using steps 311 to 316 in FIG. 3B, the anchor UPF1 is notified to buffer downlink data of the first session. Subsequently, steps 401 to 411 in FIG. 3C may be performed, such that the anchor UPF1 buffers downlink data, and the terminal device 202 is triggered to establish the first session with a UPF3 (for example, at a third moment T3).

In a procedure in which the first session is switched to an inactive state again (for details, refer to descriptions in steps 311 to 316 in FIG. 3B), similarly, an N2 connection between an access network device 204 and an AMF entity 206 is released, and an N3 connection between the access network device 204 and the UPF3 is released.

In addition, similar to step 313 in FIG. 3B, a buffer device to buffer downlink data after the first session is switched to an inactive state may further be selected based on the preset condition again. If the foregoing preset condition is met, the SMF entity 208 may still select the anchor UPF1 as a buffer device, and use step 315 to notify the anchor UPF1 to buffer data. Details are not described herein again. If the preset condition is not met, the SMF entity 208 may select the UPF3 as a buffer device, and use a step similar to step 314 to notify the UPF3 to buffer data. Herein, the SMF entity 208 may choose, based on the preset condition again, whether to delete the UPF2, to determine the buffer device. Alternatively, the SMF entity 208 may select the SMF entity in the VPLMN as a buffer device (for example, when the UPF3 does not have a capability of buffering downlink data).

It can be learned from the foregoing description that the methods in FIG. 3A and FIG. 3B and FIG. 3C are also applicable to the LBO roaming scenario.

Figure 6A:
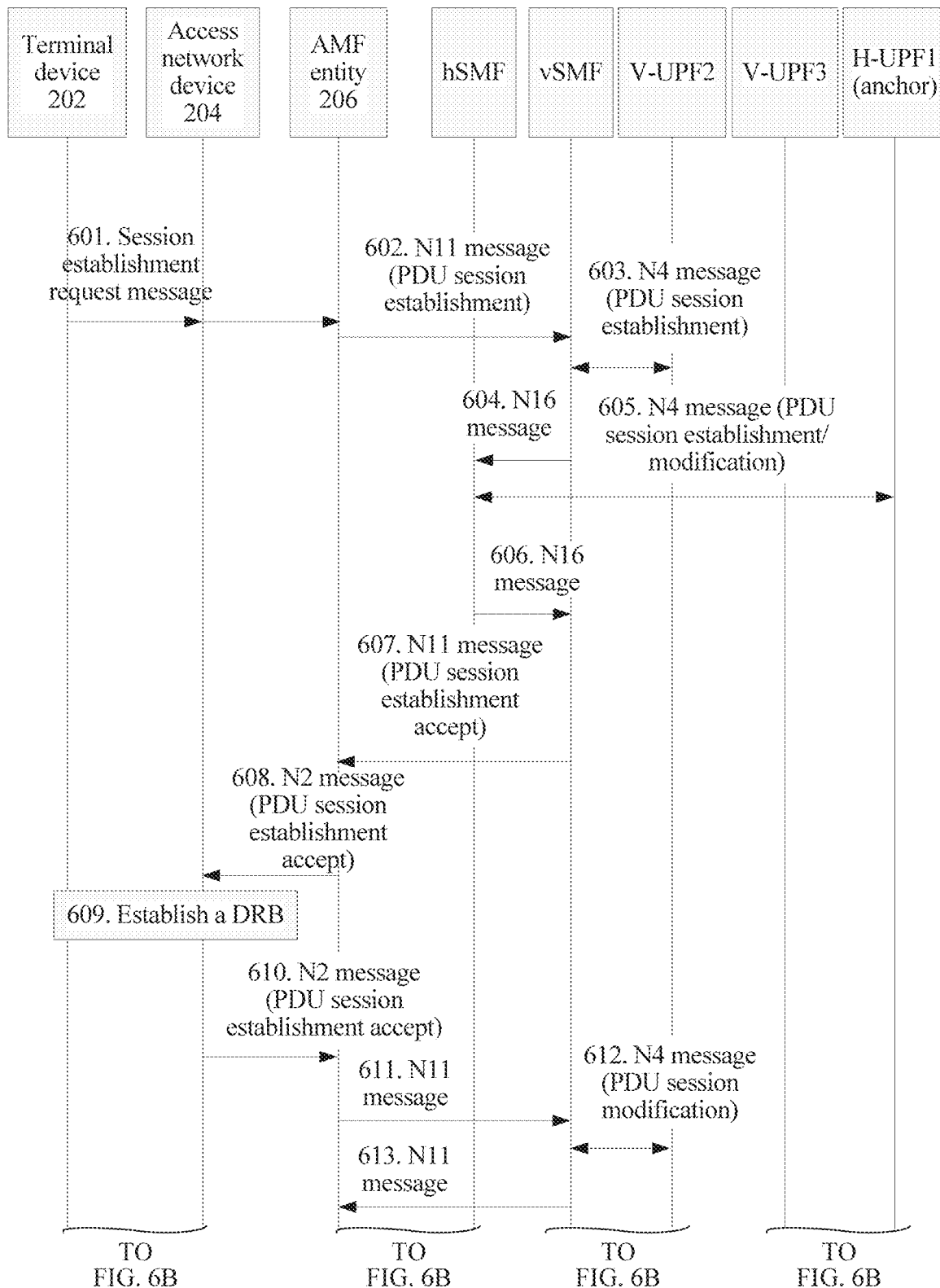
FIG. 6A to FIG. 6C are still other signaling interaction diagrams of a data buffering method according to an embodiment of the present disclosure.
Figure 6B:
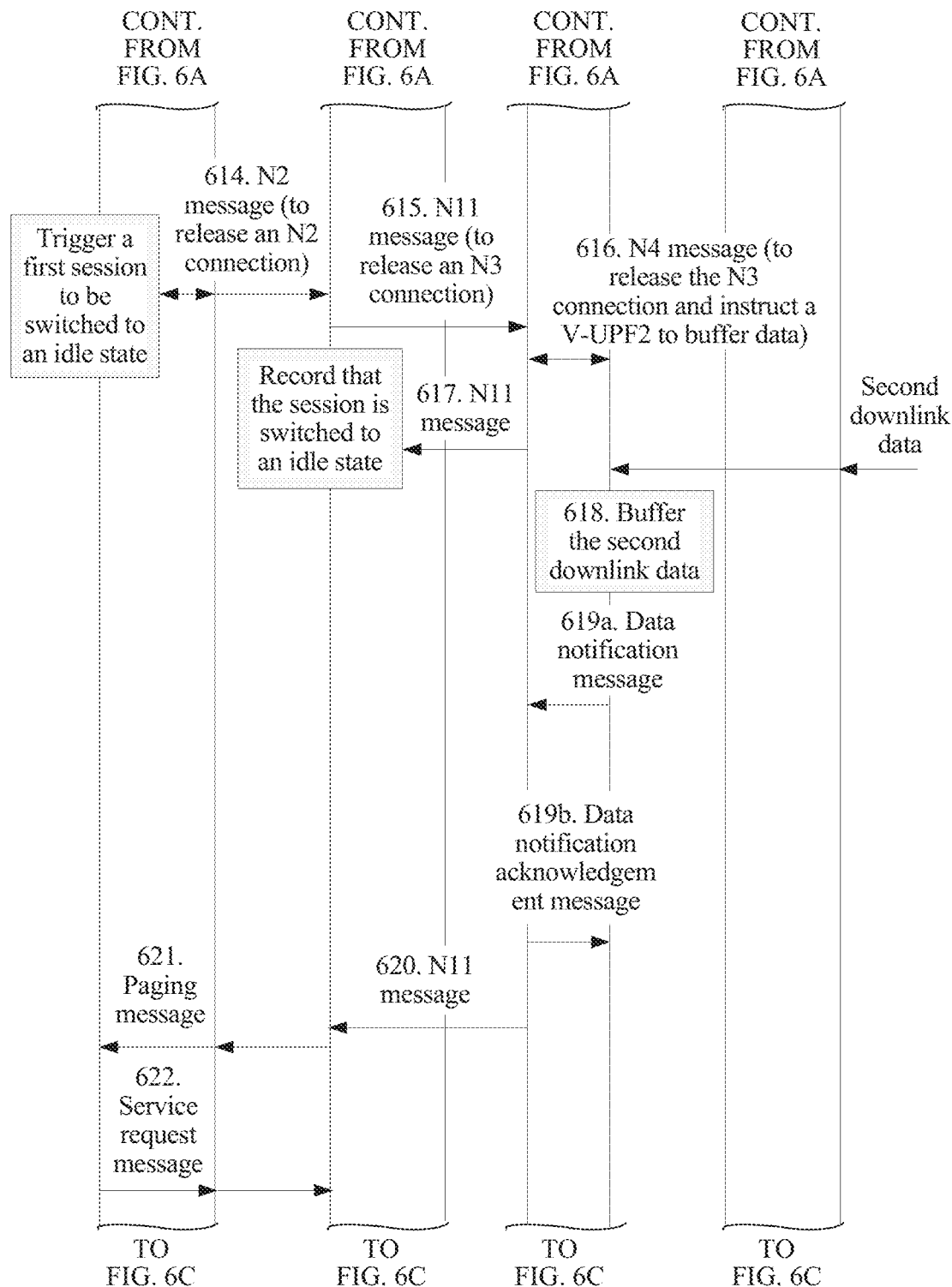
Figure 6C:
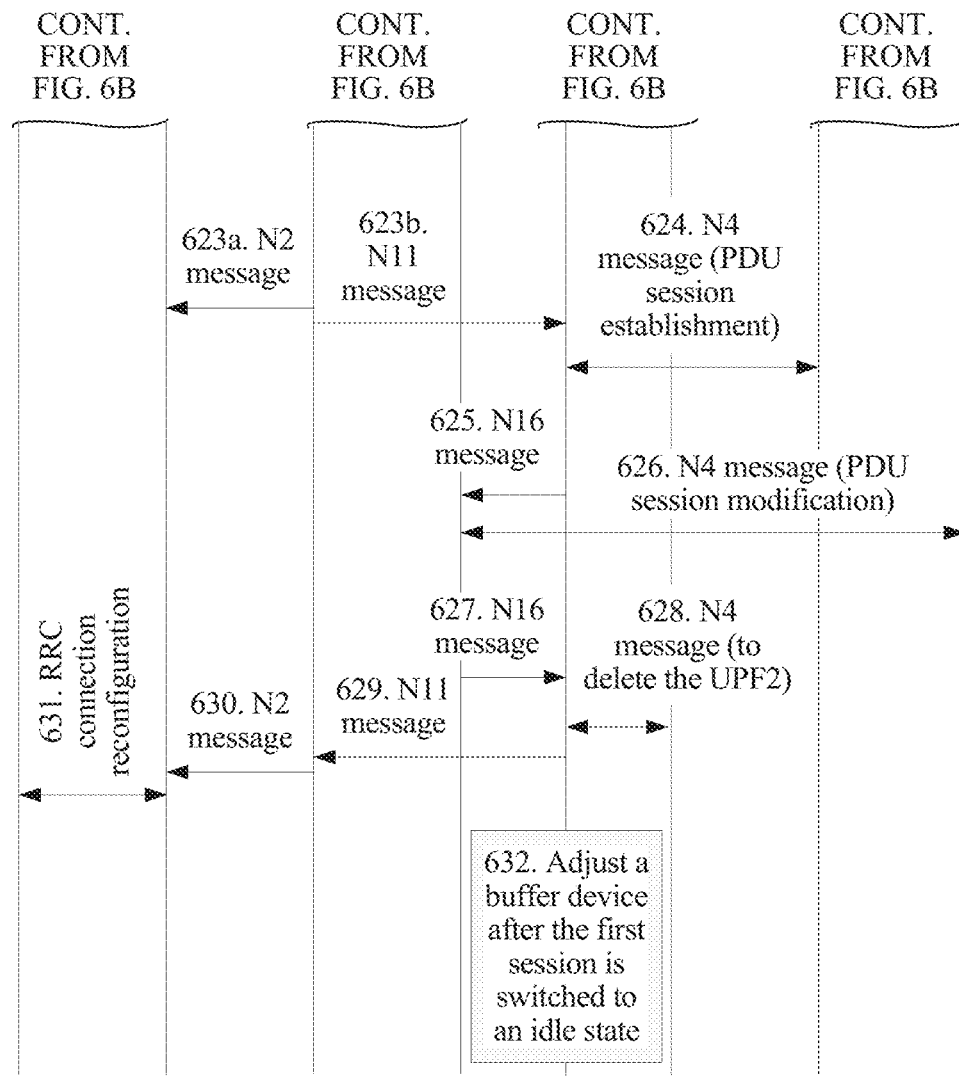

The HR roaming scenario is described with reference to FIG. 6A to FIG. 6C. FIG. 6A to FIG. 6C show signaling interaction of the foregoing method in the HR roaming scenario. In the example in FIG. 6A to FIG. 6C, in this case, a UPF1 and an SMF entity located in an HPLMN may be respectively referred to as an H-UPF1 and an hSMF, to indicate that the H-UPF1 and the hSMF are located in the HPLMN. In this case, a UPF2, a UPF3, and an SMF entity located in a VPLMN may be respectively referred to as a V-UPF2, a V-UPF3, and a vSMF, to indicate that the V-UPF2, the V-UPF3, and the vSMF are located in the VPLMN.

Before the steps shown in FIG. 6A to FIG. 6C are performed, a terminal device 202 is still in a non-roaming state. The terminal device 202 establishes a first session with the H-UPF1, and transmits service data to the H-UPF1 or receives service data from the H-UPF1. The first session has an SSC1 mode, and the H-UPF1 is an anchor of the first session.

As shown in FIG. 6A, after the terminal device 202 roams to the VPLMN, in step 601, the terminal device 202 sends a session establishment request message to an AMF entity 206 via an access network device 204.

Step 602. The AMF entity 206 sends an N11 message to the vSMF, where the N11 message may be used to establish a PDU session (the first session).

Step 603. The vSMF selects the V-UPF2, and exchanges an N4 message with the V-UPF2, to establish the PDU session (the first session). For example, the vSMF sends an N4 session establishment request message to the V-UPF2, and the V-UPF2 returns an N4 session establishment response message to the vSMF.

Step 604. The vSMF sends an N16 message to the hSMF, to establish the first session.

Step 605. The hSMF exchanges an N4 message with the H-UPF1.

In a possible implementation, roaming between the HPLMN and the VPLMN can be supported, such that a session can be normally switched. In this case, the source H-UPF1 may be still used as an anchor, and the V-UPF2 may be added to a data path of the first session of the H-UPF1 through PDU session modification.

In another possible implementation, a session cannot be normally switched, and a new anchor UPF1' needs to be selected in the HPLMN. In this case, a data path that is of the first session and that uses the V-UPF2 as an N3 UPF and the UPF1' as the anchor can be formed through PDU session establishment.

Step 606. The hSMF sends an N16 message to the vSMF.

Step 607. The vSMF returns an N11 message to the AMF entity 206. The N11 message is a PDU session establishment accept message.

Step 608. The AMF entity 206 sends an N2 message to the access network device 204, to forward the PDU session establishment accept message in step 607 to the access network device 204.

Step 609. After receiving the N2 message, the access network device 204 establishes a DRB.

Step 610. The access network device 204 returns an N2 message to the AMF entity 206. The N2 message is a PDU session establishment accept message.

Step 611. The AMF entity 206 sends an N11 message to the vSMF, to forward the PDU session establishment accept message in step 610 to the vSMF.

Step 612. The vSMF exchanges an N4 message with the V-UPF2, to forward tunnel information on an access network side to the V-UPF2 through PDU session modification.

Step 613. The vSMF returns an N11 message to the AMF entity 206 as a response to the N11 message in step 611.

For the foregoing steps, refer to steps 301 to 310 in FIG. 3A. It may be understood that, because the V-UPF2 and the V-UPF3 are controlled by the vSMF, the vSMF may directly perform steps associated with the V-UPF2 and the V-UPF3. However, because the H-UPF1 is controlled by the hSMF, a message related to the H-UPF1 needs to be forwarded between the hSMF and the vSMF.

Step 614. When a trigger condition is met, the first session is triggered to be switched to an inactive state. In this case, the terminal device 202 sends a trigger message to the access network device 204. After receiving the trigger message, the access network device 204 sends an N2 message to the AMF entity 206, to release an N2 connection between the access network device 204 and the AMF entity 206.

Step 615. The AMF entity 206 sends an N11 message to the vSMF, to request to release an N3 connection between the access network device 204 and the V-UPF2.

Step 616. The vSMF notifies, based on a preset condition, the V-UPF2 to buffer second downlink data of the first session, where the preset condition includes SSC information indicating that the first session has the SSC1 mode.

For example, the vSMF exchanges an N4 message with the V-UPF2, to request to release the N3 connection between the access network device 204 and the V-UPF2. Optionally, the vSMF may use the N4 message for requesting to release the N3 connection, to notify the V-UPF2 to buffer the second downlink data of the first session. In other words, the N4 message in step 616 has two functions: (1) requesting to release the N3 connection between the access network device 204 and the V-UPF2; and (2) notifying the V-UPF2 to buffer the second downlink data of the first session.

Step 617. The vSMF returns an N11 message to the AMF entity 206, to acknowledge release of the N3 connection between the access network device 204 and the V-UPF2, and after receiving the N11 message, the AMF entity 206 records that the first session is switched to an inactive state.

Therefore, after receiving the second downlink data, the H-UPF1 (or the UPF1') forwards the second downlink data to the V-UPF2. In step 618, the V-UPF2 buffers the second downlink data.

Subsequently, establishment of the first session between the terminal device 202 and the V-UPF3 may be triggered using steps 619a to 631. For steps 619a to 631, refer to descriptions in steps 402a to 411 in FIG. 3C. A difference is as follows. Because the second downlink data is buffered in the V-UPF2, a data notification message is sent by the V-UPF2 to the vSMF that controls the V-UPF2; an operation of the SMF entity 208 in FIG. 3C may be performed by the vSMF. Additionally, an operation of the UPF1 controlled by the hSMF needs to be implemented through forwarding between the vSMF and the hSMF.

In a procedure in which the first session is switched to an inactive state again (for details, refer to descriptions in steps 614 to 617), in step 632, the vSMF may further update a buffer device to buffer downlink data after the first session is switched to an inactive state. For example, if mobility statistics information indicates that the terminal device 202 stays in the VPLMN for a long time (for example, a time in which the terminal device 202 stays in the VPLMN is greater than a third threshold), the vSMF may update the UPF3 as a buffer device, and notify the UPF3 to buffer data. Alternatively, the vSMF may update the vSMF as a buffer device (for example, when the UPF3 does not have a capability of buffering downlink data).

That is, in the HR roaming scenario, the vSMF selects the N3 UPF as a buffer device.

In addition, based on the foregoing steps, when a session of the terminal device 202 in a roaming (either LBO or HR) scenario is triggered again to be switched to an inactive state, the buffer device may be updated, to avoid frequent interaction with the anchor in the HPLMN, thereby further improving user experience.

Figure 7:
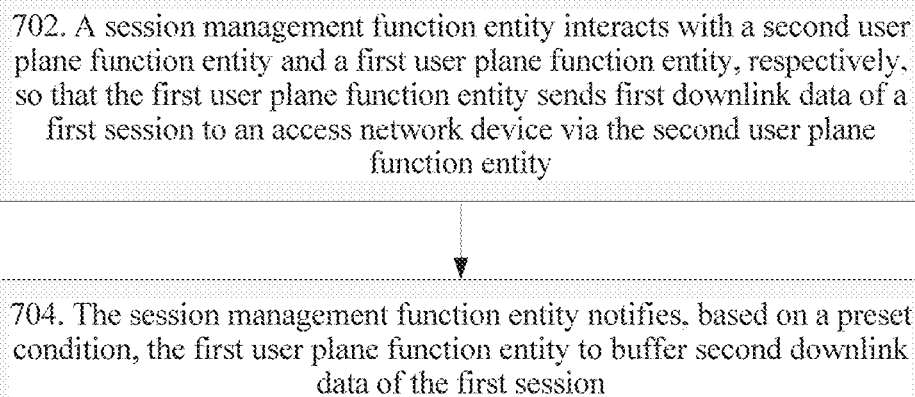
FIG. 7 is a flowchart of a data buffering method according to an embodiment of the present disclosure.

FIG. 7 shows a data buffering method according to an embodiment of the present disclosure. The method may be executed by a session management function entity (for example, the foregoing SMF entity 208 or the vSMF in the LBO roaming scenario). FIG. 7 is described with reference to FIG. 2 to FIG. 6C. For example, the method includes the following steps.

Step 702. The session management function entity interacts with a second user plane function entity (such as the UPF2) and a first user plane function entity (such as the UPF1), respectively, such that the first user plane function entity sends first downlink data of a first session to an access network device (such as the access network device 204) via the second user plane function entity, where the first user plane function entity is an anchor of the first session.

For example, step 702 may be implemented using steps 303 and 309b in FIG. 3A.

Step 704. The session management function entity notifies, based on a preset condition, the first user plane function entity to buffer second downlink data of the first session, where the preset condition includes: SSC information indicates that the first session has a first session and service continuity SSC1 mode, and the second downlink data is downlink data to be received by the first user plane function entity after the first session is switched to an inactive state.

For example, step 704 may be implemented using step 315 in FIG. 3B.

Based on the foregoing data buffering solution, the session management function entity notifies, based on the preset condition, an anchor user plane function entity to buffer the second downlink data. In this way, after the first session is switched to an active state, a transmission path of the second downlink data buffered by the anchor user plane function entity and that of incoming third downlink data that is to be received after the first session is switched to an active state again are the same. Therefore, a problem that downlink data received by a terminal is out of order is avoided, and user experience is improved. In addition, buffered downlink data can be obtained without establishing an additional forwarding tunnel or releasing the established forwarding tunnel, such that signaling interaction between UPF entities is reduced. Therefore, delay is reduced, and user experience is further improved.

Optionally, the preset condition includes at least one of the following: the SSC information indicates that the first session has the first session and service continuity SSC1 mode; mobility information indicates that the terminal device is a high mobility device; or the session management function entity and the first user plane function entity belong to a same operator network. The first session having the SSC1 mode indicates that a UPF used as a PDU session anchor when a PDU session is initially established remains unchanged. In other words, in a movement process of the terminal device, an anchor UPF entity of the first session having the SSC1 mode remains unchanged. The session management function entity and the first user plane function entity belonging to a same operator network may include a non-roaming scenario or a local breakout LBO roaming scenario. Alternatively, mobility of the terminal device further needs to be considered during buffer device selection.

Optionally, the method further includes the following step. The session management function entity interacts with a third user plane function entity (such as the UPF3) and the first user plane function entity, respectively, such that the first user plane function entity sends the second downlink data and third downlink data to the access network device (which may be the access network device 204 or another access network device) via the third user plane function entity. The third downlink data is downlink data to be received by the first user plane function entity after the first session is switched to an active state (for example, for details, refer to steps 406 and 407 in FIG. 3C).

Optionally, step 704 includes the following steps. The session management function entity selects, based on the preset condition, the first user plane function entity as a user plane function entity to buffer the second downlink data. Additionally, the session management function entity notifies the first user plane function entity to buffer the second downlink data after receiving the second downlink data (for example, for details, refer to steps 313 to 315 in FIG. 3B).

Optionally, the method further includes the following step. The session management function entity obtains mobility information of the terminal device. For example, the session management function entity may obtain the mobility information of the terminal device in the following manner. The session management function entity receives a mobility attribute from a mobility management function entity (such as the AMF entity 206), where the mobility information is the mobility attribute; or the session management function entity obtains mobility statistics information, where the mobility information is the mobility statistics information; or the session management function entity receives a mobility attribute from a mobility management function entity, obtains mobility statistics information, and determines the mobility information based on the mobility attribute and the mobility statistics information. The mobility attribute includes at least a high mobility attribute or a low mobility attribute, and the mobility statistics information is used to indicate a movement speed or a stay time of the terminal device (for example, for details, refer to steps 302, 302a, and 302b in FIG. 3A).

For example, the session management function entity obtains mobility statistics information according to the following step. The session management function entity receives the mobility statistics information from the mobility management function entity. Alternatively, the session management function entity obtains the mobility statistics information from a network data analytics (NWDA) device (such as the NWDA device 214).

Optionally, the method further includes the following step. After the session management function entity selects the first user plane function entity as a user plane function entity to buffer the second downlink data, the session management function entity releases the second user plane function entity (for example, for details, refer to step 314 in FIG. 3B). Therefore, when the anchor user plane function entity is selected as a buffer device, the second user plane function entity may be directly released, such that network resources are saved.

Optionally, steps 702 and 704 may be replaced with the following steps. The session management function entity interacts with a second user plane function entity and a first user plane function entity, respectively, such that the first user plane function entity sends first downlink data of a first session via the second user plane function entity. Additionally, when the first session enters an inactive state, the session management function entity releases the second user plane function entity (for example, the session management function entity first determines to release the second user plane function entity). The second user plane function entity is a user plane function entity that is of the first session and is connected to an access network device. The first user plane function entity may be an anchor UPF, or may be a UPF between the second user plane function entity and an anchor UPF.

Optionally, the session management function entity notifies the first user plane function entity to buffer second downlink data of the first session. Alternatively, the session management function network element notifies the first user plane function network element to release a connection between the first user plane function network element and the second user plane function network element, such that the first user plane function entity "automatically" becomes a buffer device to buffer second downlink data after the first session is switched to an inactive state.

Based on the foregoing solution, after the session management function entity deletes the second user plane function entity, the first user plane function entity becomes a new user plane function entity connected to the access network device, and buffers the second downlink data. In this way, after the first session is switched to an active state, a transmission path of the second downlink data buffered by the first user plane function entity and that of incoming third downlink data that is to be received after the first session is switched to an active state again are the same. Therefore, a problem that downlink data received by a terminal is out of order is avoided. In addition, buffered downlink data can be obtained without establishing an additional forwarding tunnel or releasing the established forwarding tunnel, such that signaling interaction between UPF entities is reduced. Therefore, delay is reduced, and user experience is improved.

For example, the session management function entity first determines, based on at least one of session and service continuity information, mobility information, or policy information, to release the second user plane function entity. For example, when any one of the following conditions is met, the session management function entity determines to release the second user plane function entity: the session and service continuity information indicates that the first session has a first session and service continuity mode; the mobility information indicates that the terminal device is a high mobility device; the policy information indicates to release the second user plane function entity; or the session management function entity and the first user plane function entity belong to a same operator network (which is applicable to a non-roaming scenario or a local breakout (LBO) roaming scenario).

Optionally, the foregoing methods are applicable to a home routed (HR) roaming scenario. The session management function entity (such as the vSMF) and the third user plane function entity are located in a VPLMN in the HR roaming scenario. The method further includes the following step. The session management function entity adjusts the buffer device, where the buffer device is used to buffer fourth downlink data of the first session after the first session is switched to an inactive state (for example, for details, refer to step 632 in FIG. 6C).

For example, the session management function entity adjusts the buffer device according to the following step. The session management function entity determines the third user plane function entity as the buffer device. Alternatively, the session management function entity determines the session management function entity as the buffer device. Therefore, after the buffer device is updated, frequent interaction with the anchor user plane function entity in an HPLMN can be avoided, thereby further improving user experience.

Figure 8A:
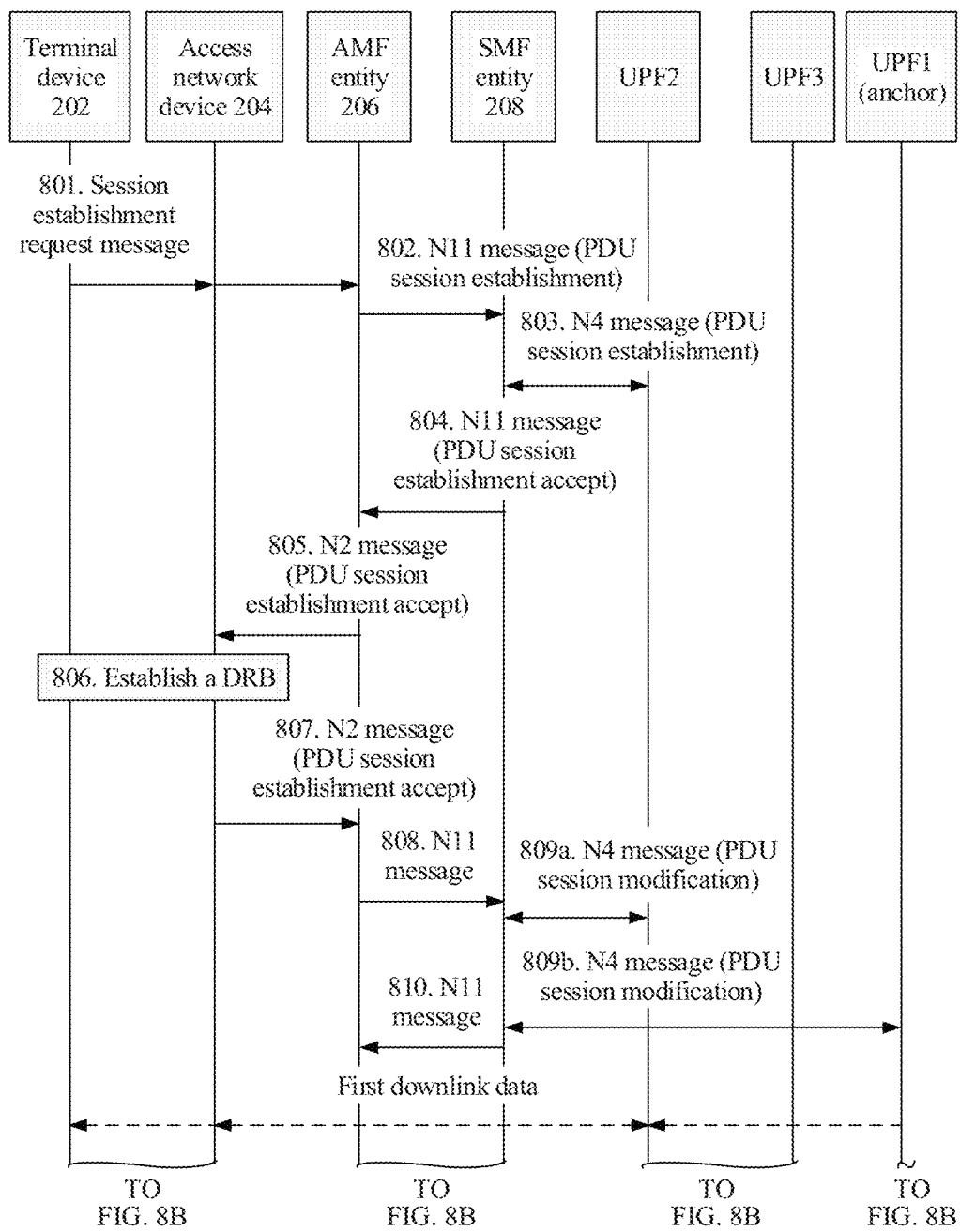
FIG. 8A, FIG. 8B, and FIG. 8C are signaling interaction diagrams of a data buffering method according to another embodiment of the present disclosure.
Figure 8B:
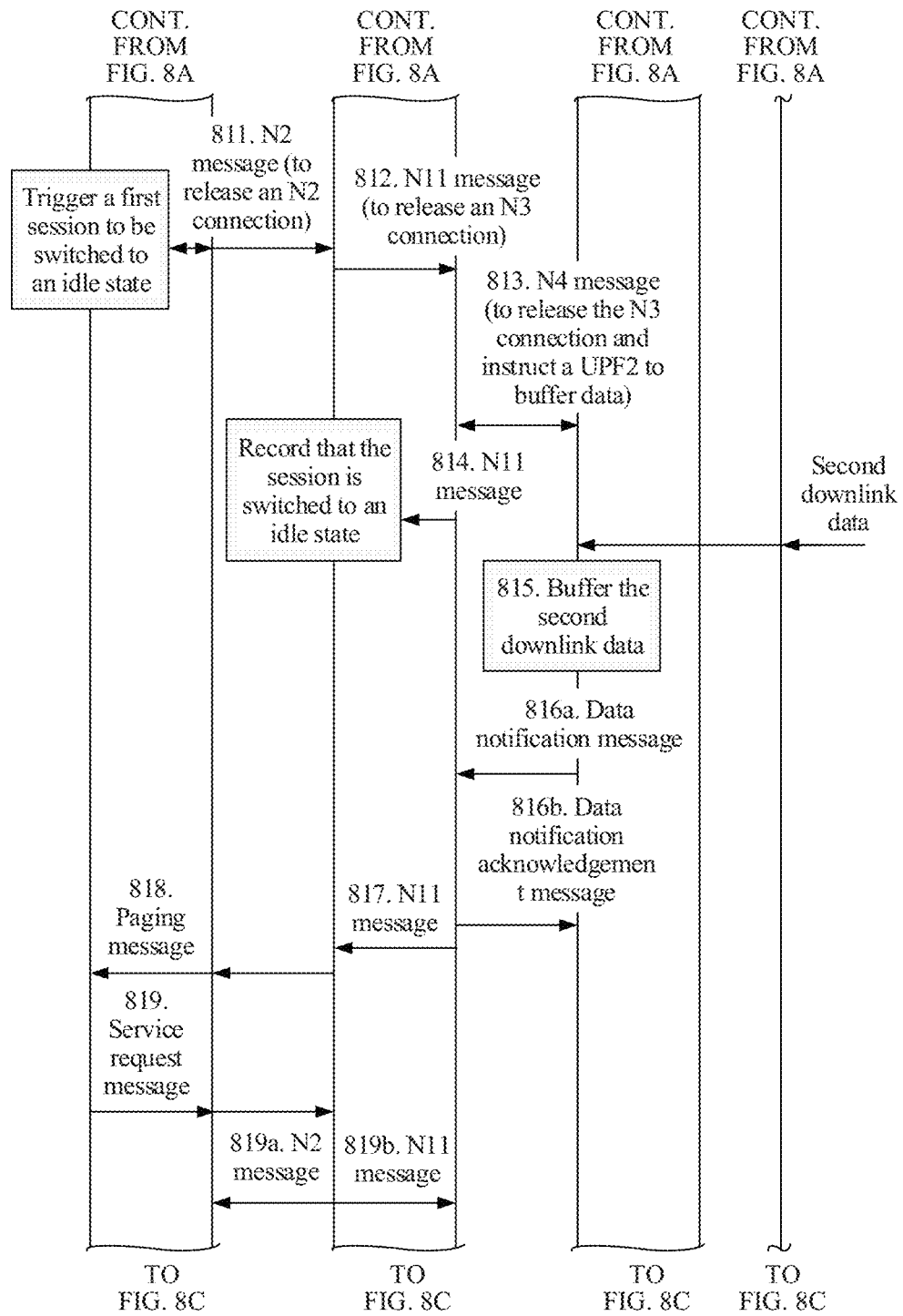
Figure 8C:
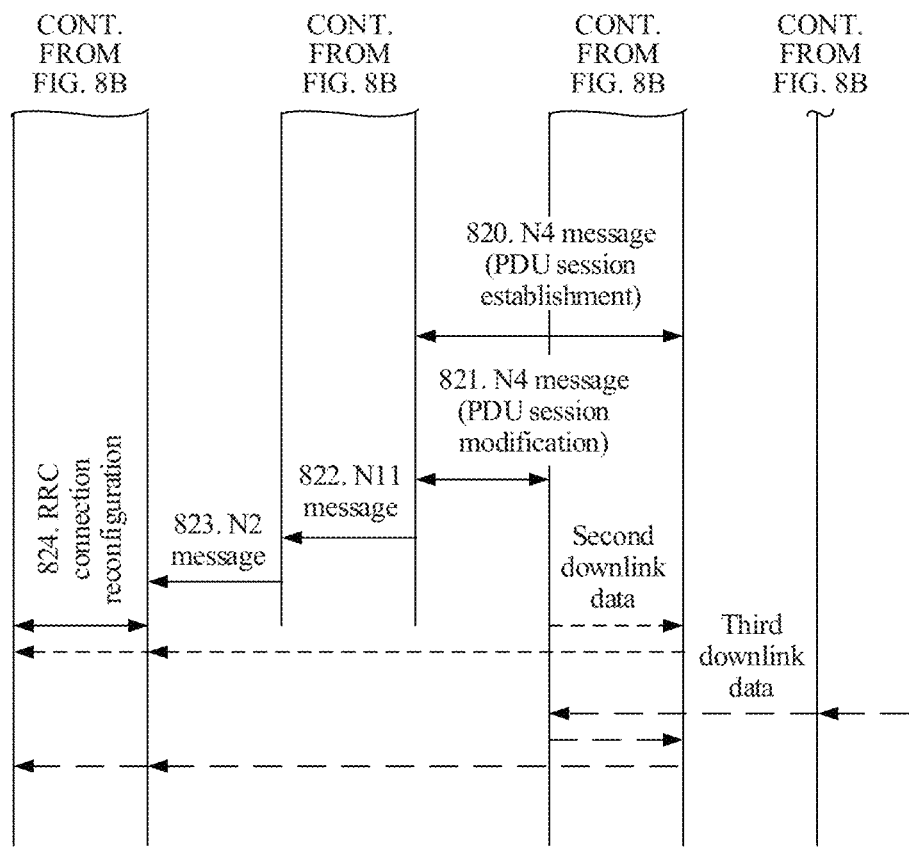

A data buffering method in another embodiment of this application is described below with reference to FIG. 8A to FIG. 8C and FIG. 8B. FIG. 8A to FIG. 8C show signaling interaction of the method. FIG. 8D shows a data path change in a movement process of a terminal device 202. The method is applicable to a PDU session having an SSC3 mode. There may be a plurality of anchor UPFs at a same moment in the SSC3 mode. In this scenario, there may be a plurality of "sessions" (such as multiple PDU sessions) or a plurality of "session branches" of a session. The following is described using a plurality of "sessions" as an example.

Before the steps shown in FIG. 8A to FIG. 8C are performed (for example, at a first moment T1 in FIG. 8D), the terminal device establishes a first session with a UPF1, and transmits service data to the UPF1 or receives service data from the UPF1. The first session has the SSC3 mode, and the UPF1 is an initial anchor of the first session.

In FIG. 8A, for steps 801 to 810, refer to descriptions in steps 301 to 310 in FIG. 3A. Details are not described herein again.

It should be noted that, because the first session has the SSC3 mode, the N4 message in step 803 has two functions: (1) establishing the first session, that is, adding the UPF2, as an N3 UPF, to the data path of the first session of the foregoing anchor UPF1; and (2) establishing a new second session using the UPF2 as an anchor.

Based on the foregoing steps, the UPF1 sends first downlink data of the first session to the access network device 204 via the UPF2. As shown in FIG. 8B, at a second moment T2, the data path of the first session is: UPF1→UPF2→access network device (not shown in the figure)→terminal device 202.

In addition, a data path (not shown in the figure) of the second session established using the UPF2 as an anchor is: UPF2→access network device→terminal device 202.

Step 811. When a trigger condition is met, the first session is triggered to be switched to an inactive state. In this case, the terminal device 202 sends a trigger message to the access network device 204. After receiving the trigger message, the access network device 204 sends an N2 message to the AMF entity 206, to release an N2 connection that is of the first session and is between the access network device 204 and the AMF entity 206.

Step 812. The AMF entity 206 sends an N11 message to the SMF entity 208, to request to release the N3 connection that is of the first session and is between the access network device 204 and the UPF2.

Step 813. The SMF entity 208 selects the UPF2 based on a preset condition, or determines, based on a preset condition, not to delete the UPF2, and notifies the UPF2 to buffer second downlink data of the first session, where the preset condition includes: the SSC information indicates that the first session has the SSC3 mode.

For example, the SMF entity 208 exchanges an N4 message with the UPF2, to request to release the N3 connection that is of the first session and is between the access network device 204 and the UPF2. Optionally, the SMF entity 208 may use the N4 message for requesting to release the N3 connection, to notify the UPF2 to buffer the second downlink data of the first session. In other words, the N4 message in step 813 has two functions: (1) requesting to release the N3 connection that is of the first session and is between the access network device 204 and the UPF2; and (2) notifying the UPF2 to buffer the second downlink data of the first session.

Step 814. The SMF entity 208 returns an N11 message to the AMF entity 206, to acknowledge release of the N3 connection that is of the first session and is between the access network device 204 and the UPF2, and after receiving the N11 message, the AMF entity 206 records that the first session is switched to an inactive state.

Similarly, when a trigger condition is met, the second session may be triggered to be switched to an inactive state. If all sessions of the terminal device 202 are switched to an inactive state, the terminal device 202 is correspondingly switched to an idle (CM-IDLE) state.

In a possible implementation, the first session and the second session may be switched to an inactive state using one procedure.

In another possible implementation, the second session may be switched to an inactive state using a procedure independent of that of the first session. A buffer device that is used to buffer downlink data for the second session may be selected the same as or different from that of the first session. For example, the initial anchor UPF1 (for details, refer to descriptions in FIG. 3A to FIG. 7) or a current N3 UPF (namely, the UPF2) may be selected as a buffer device for the second session. No limitation is imposed in the present disclosure. In the SSC3 mode, there may be a plurality of "sessions" or a plurality of "session branches" of a session. The SMF entity 208 may select different buffer devices for the plurality of sessions or the plurality of session branches of a session, respectively, and notify, using an N4 message, their respective buffer devices to buffer downlink data to be received.

The following is still described by taking the first session (a session branch) as an example.

When the first session is in an inactive state, the second downlink data of the first session from a data network 212 arrives at the UPF2.

Step 815. The UPF2 buffers the second downlink data.

Step 816a. After receiving the second downlink data, the UPF2 sends a data notification message to the SMF entity 208.

An execution sequence of step 815 and step 816a is not limited in the present disclosure. Step 816a may be performed after step 815, or step 815 may be performed after step 816a, or step 815 and step 816a are performed simultaneously.

Optionally, in step 816b, the SMF entity 208 returns a data notification acknowledgement message to the UPF2.

For steps 817 to 819b, refer to descriptions in steps 403 to 405b in FIG. 3C. Details are not described herein again.

Step 820. The SMF entity 208 exchanges an N4 message with a UPF3, to establish a PDU session. Herein, a purpose of exchanging the N4 message is to establish the first session and the second session, and establish a new third session using the UPF3 as an anchor UPF.

Step 821. The SMF entity 208 exchanges an N4 message with the UPF2, to modify a PDU session. For example, the SMF entity 208 exchanges the N4 message with the UPF2, to add the UPF3, as an N3 UPF, to a data path of an existing session (for example, the first session and the second session), such that the UPF2 is connected to the UPF3.

That is, based on steps 820 and 821, a data path of incoming third downlink data of the first session to be received is changed to: UPF1→UPF2→UPF3→access network device→terminal device 202, a data path of incoming downlink data of the second session to be received is changed to: UPF2→UPF3→access network device→terminal device 202, and a data path of downlink data of the newly established third session is: UPF3→access network device→terminal device 202.

In addition, a data path of the buffered second downlink data of the first session is: UPF2→UPF3→access network device→terminal device 202.

For steps 822 to 824, refer to descriptions in steps 409 to 411 in FIG. 3C. Details are not described herein again.

In this way, for the first session, the UPF3 is an N3 UPF. The UPF2 sends the buffered second downlink data to the terminal device 202 via the UPF3, and the UPF1 sends the received new third downlink data of the first session to the terminal device 202 successively via the UPF2 and the UPF3. For example, at a third moment T3, the data path (not shown in the figure) of the buffered second downlink data is: UPF2→UPF3→access network device→terminal device 202. As shown in FIG. 8B, at the third moment T3, the transmission path of the third downlink data is: UPF1→UPF2→UPF3→access network device (not shown in the figure)→terminal device 202. Therefore, the data path for transmitting the second downlink data is the same as that for transmitting the third downlink data starting from the UPF2, such that a problem that downlink data received by a terminal is out of order is avoided, and user experience is improved. In addition, after the method in FIG. 8A to FIG. 8C is used, buffered downlink data can be obtained without establishing an additional forwarding tunnel or releasing the established forwarding tunnel, such that signaling interaction between UPF entities is reduced. Therefore, delay is reduced, and user experience is further improved.

Optionally, when the trigger condition is met, the first session may be triggered again to be switched to an inactive state. For the process, refer to descriptions in steps 811 to 814. Details are not described herein again. Similarly, in this process, the N2 connection between the access network device 204 and the AMF entity 206 is released, and an N3 connection between the access network device 204 and the UPF3 is released. Optionally, the SMF entity 208 may further update the buffer device (for example, to the anchor UPF3), and notify the updated buffer device to buffer downlink data.

FIG. 9 shows a data buffering method according to an embodiment of the present disclosure. The method may be executed by a session management function entity (such as the SMF entity 208). FIG. 9 is described with reference to FIG. 2 to FIG. 4, FIG. 8A to FIG. 8C, and FIG. 8D. For example, the method includes the following steps.

Step 902. The session management function entity interacts with a second user plane function entity (such as the UPF2) and a first user plane function entity (such as the UPF1), respectively, such that the first user plane function entity sends first downlink data of a first session to an access network device (such as the access network device 204) via the second user plane function entity, where the first user plane function entity is an anchor of the first session.

For example, step 902 may be implemented using steps 803 and 809b in FIG. 8A.

Step 904. The session management function entity notifies, based on a preset condition, the second user plane function entity to buffer second downlink data of the first session, where the preset condition includes: SSC information indicates that the first session has a third session and service continuity SSC3 mode, and the second downlink data is downlink data to be received by the second user plane function entity after the first session is switched to an inactive state.

For example, step 904 may be implemented using step 813 in FIG. 8B.

The first session having an SSC3 mode indicates that there may be a plurality of anchor UPFs at a same moment in the SSC3 mode. In other words, there may be a plurality of "sessions" or a plurality of "session branches" of a session.

Step 906. The session management function entity interacts with a third user plane function entity and the second user plane function entity, respectively, such that the second user plane function entity sends the second downlink data to the access network device (which may be the access network device 204 or another access network device) via the third user plane function entity, and the first user plane function entity sends third downlink data to the access network device (which may be the access network device 204 or another access network device) via the second user plane function entity and the third user plane function entity, where the third downlink data is downlink data to be received by the first user plane function entity after the first session is switched to an active state.

For example, step 906 may be implemented using steps 820 and 821 in FIG. 8C.

Optionally, step 904 includes the following steps. The session management function entity selects, based on the preset condition, the second user plane function entity as a buffer device to buffer the second downlink data. Additionally, the session management function entity notifies the second user plane function entity to buffer the second downlink data after receiving the second downlink data.

Optionally, because the first session has the SSC3 mode, a buffer device that is used to buffer downlink data for a second session may be selected the same as or different from that of the first session. For example, for the second session, the session management function entity may select the initial anchor UPF1 (for details, refer to descriptions in FIG. 3A to FIG. 7) or a current N3 UPF (namely, the UPF2) as a buffer device, and notify, using an N4 message, their respective buffer devices to buffer received downlink data.

In addition, the method shown in FIG. 8A to FIG. 8C is further applicable to a multi-homed PDU session (or multi-homing PDU session) scenario or an uplink classifier (ULCL) scenario.

Figure 10:
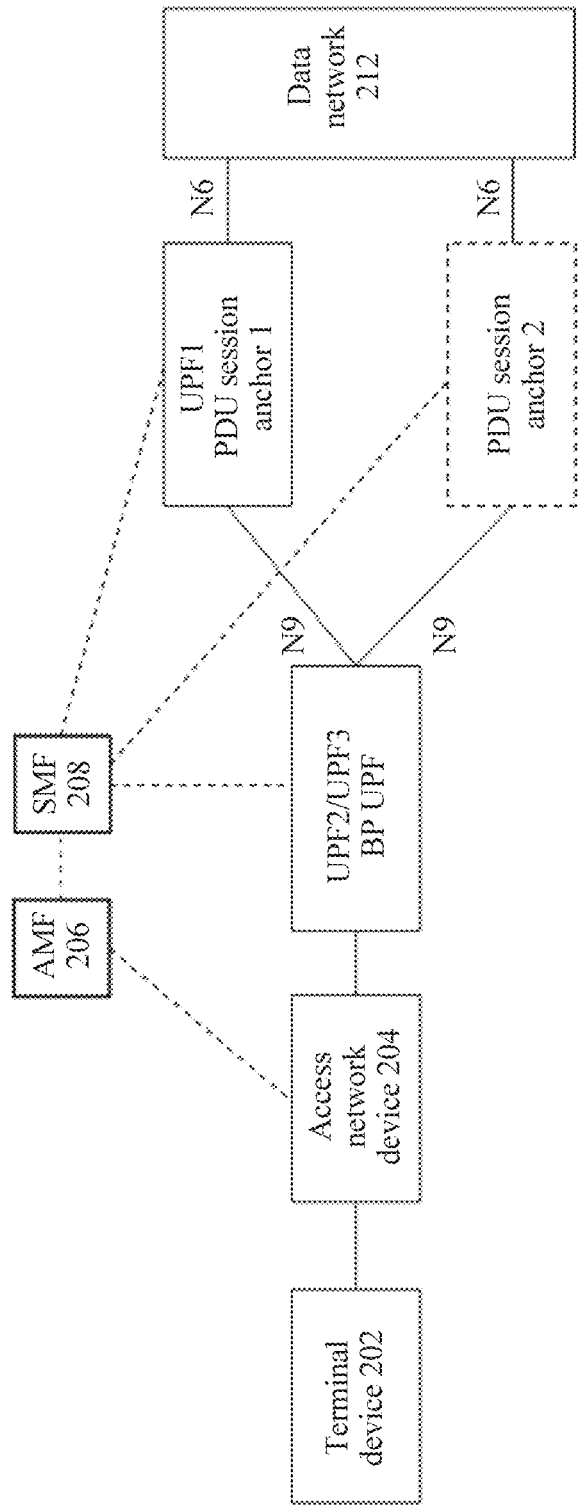
FIG. 10 and FIG. 11 are schematic diagrams of scenarios to which the method in FIG. 9 may be applied.

FIG. 10 is a schematic diagram of the multi-horned PDU session scenario. An access network device 204 is connected to a UPF entity supporting branching point (BP) functionality (BP UPF for short). The BP UPF is connected to each PDU session anchor (such as a PDU session anchor 1 and a PDU session anchor 2). In a multi-homed PDU session technology, a plurality of paths reaching the data network 212 are provided using a plurality of PDU session anchors. The BP UPF can forward uplink data to different PDU session anchors, and combine downlink data from different PDU session anchors.

For example, the PDU session anchor 1 may perform an operation of the UPF1 in FIG. 8A to FIG. 8C. A UPF2 can be used to implement a function of the BP UPF, and is connected to the data network 212 using a session branch 1 of the PDU session anchor 1 and a session branch 2 of the PDU session anchor 2. The PDU session anchor 2 and the BP UPF UPF2 may be disposed separately, or the PDU session anchor 2 and the BP UPF UPF2 may be disposed together. Similarly, a UPF3 can also be used to implement the function of the BP UPF, and is connected to the data network 212 using the session branch 1 of the PDU session anchor 1 and the session branch 2 of the PDU session anchor 2. The PDU session anchor 2 and the BP UPF UPF3 may be disposed separately, or the PDU session anchor 2 and the BP UPF UPF3 may be disposed together.

For example, at a first moment T1, the session branch 1 having an SSC3 mode is created, and the anchor UPF1 is used as a buffer device to buffer downlink data. At a second moment T2, the UPF2 is added as a BP UPF using the multi-homed PDU session technology, and the session branch 2 is created, where the UPF2 is a branching point of the session branch 1 and the session branch 2. After each of the session branches enters an inactive state, the UPF2 is updated as a buffer device to buffer downlink data. Within a time period from T2 to T3, a terminal device 202 moves, and downlink data is buffered at the UPF2 after a downlink service is initiated. BP UPF reallocation is triggered after a paging response is made. In other words, at the third moment T3, the BP UPF is changed to the UPF3. The UPF3 may obtain the buffered downlink data from the UPF2, and establish a new session branch 3. The UPF3 is a branching point of the session branch 1, the session branch 2, and the session branch 3. After each of the session branches enters an inactive state again, the UPF3 is updated as a buffer device to buffer downlink data.

For the multi-homed PDU session scenario, refer to a manner according to other approaches where an N3 UPF establishes a forwarding tunnel with a BP UPF buffering downlink data and obtains the buffered downlink data using the forwarding tunnel. After the buffered downlink data is obtained, the forwarding tunnel may be deleted.

It should be noted that in the foregoing scenario, when the session branch is triggered to be switched to an inactive state, only an N3 connection of the BP UPF needs to be released, and the BP UPF does not need to be deleted.

Therefore, in the multi-homed PDU session scenario, a BP UPF that recently serves the terminal device 202 may be set as a buffer device. As such, downlink data of each session branch connected to the BP UPF can be buffered at the branching point BP UPF. After downlink data of any session branch is activated, the BP UPF is updated. In addition, even if no downlink service of a session branch is activated, a buffered data obtaining procedure is optimized with BP UPF reallocation.

Figure 11:
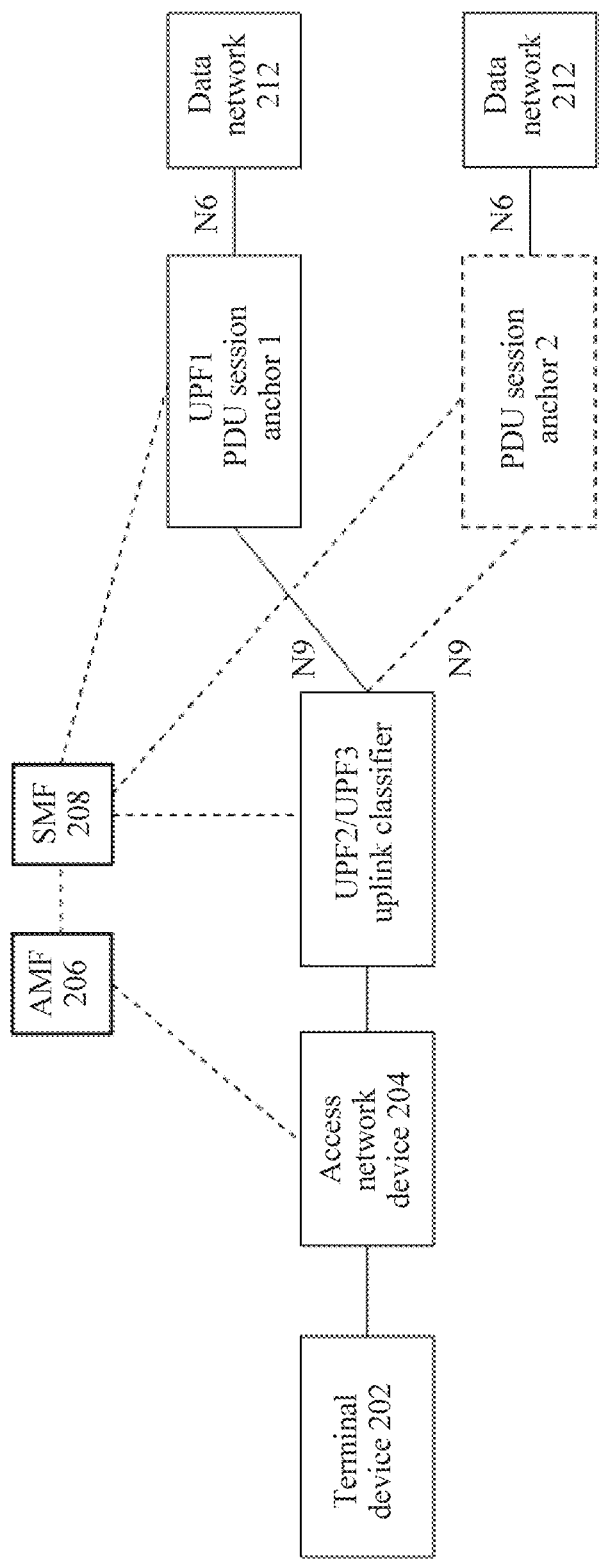

Similarly, FIG. 11 is a schematic diagram of the ULCL scenario. An access network device 204 is connected to a UPF entity supporting ULCL functionality (ULCL UPF for short). The ULCL UPF is connected to each PDU session anchor (such as a PDU session anchor 1 and a PDU session anchor 2). In a ULCL technology, a plurality of session branches reaching the data network 212 are provided using a plurality of PDU session anchors. The ULCL UPF can forward uplink data to different PDU session anchors, and combine downlink data from different PDU session anchors.

For example, the PDU session anchor 1 may perform an operation of the UPF1 in FIG. 8A to FIG. 8C. A UPF2 can be used to implement a function of the ULCL UPF, and is connected to the data network 212 using a session branch 1 of the PDU session anchor 1 and a session branch 2 of the PDU session anchor 2. The PDU session anchor 2 and the ULCL UPF UPF2 may be disposed separately, or the PDU session anchor 2 and the ULCL, UPF UPF2 may be disposed together. Similarly, a UPF3 can also be used to implement the function of the ULCL UPF, and is connected to the data network 212 using the session branch 1 of the PDU session anchor 1 and the session branch 2 of the PDU session anchor 2. The PDU session anchor 2 and the ULCL UPF UPF3 may be disposed separately, or the PDU session anchor 2 and the ULCL UPF UPF3 may be disposed together.

For example, at a first moment T1, the session branch 1 having an SSC3 mode is created, and the anchor UPF1 is used as a buffer device to buffer downlink data. At a second moment T2, the UPF2 is added as a ULCL UPF using the ULCL technology, and the session branch 2 is created, where the UPF2 is an uplink classifier of the session branch 1 and the session branch 2. After each of the session branches enters an inactive state, the UPF2 is updated as a buffer device to buffer downlink data. Within a time period from T2 to T3, a terminal device 202 moves, and downlink data is buffered at the UPF2 after a downlink service is initiated. ULCL UPF reallocation is triggered after a paging response is made. In other words, at the third moment T3, the ULCL UPF is changed to the UPF3. The UPF3 may obtain the buffered downlink data from the UPF2, and establish a new session branch 3. The UPF3 is an uplink classifier of the session branch 1, the session branch 2, and the session branch 3. After each of the session branches enters an inactive state again, the UPF3 is updated as a buffer device to buffer downlink data.

Therefore, in the ULCL scenario, a ULCL UPF that recently serves the terminal device 202 may be set as a buffer device.

In addition, in the multi-homed PDU session scenario and the ULCL scenario, different buffer devices may be set for session branches. For example, the PDU session anchor 1 (the UPF1) is set as a buffer device for the session branch 1 connected to the UPF1, and the PDU session anchor 2 is set as a buffer device for the session branch 2. Therefore, independent processing may be implemented for each session branch, such that processing between the session branches does not affect each other, and different requirements are met.

In the foregoing embodiments provided in this application, various solutions such as the data buffering method provided in the embodiments of this application are described from perspectives of each network element and interaction between the network elements. It may be understood that, to implement the foregoing functions, each network element such as the foregoing session management function entity includes a corresponding hardware structure and/or software module for performing each function. A person skilled in the art should easily be aware that, units and algorithms steps in the examples described with reference to the embodiments disclosed in this specification may be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12A:
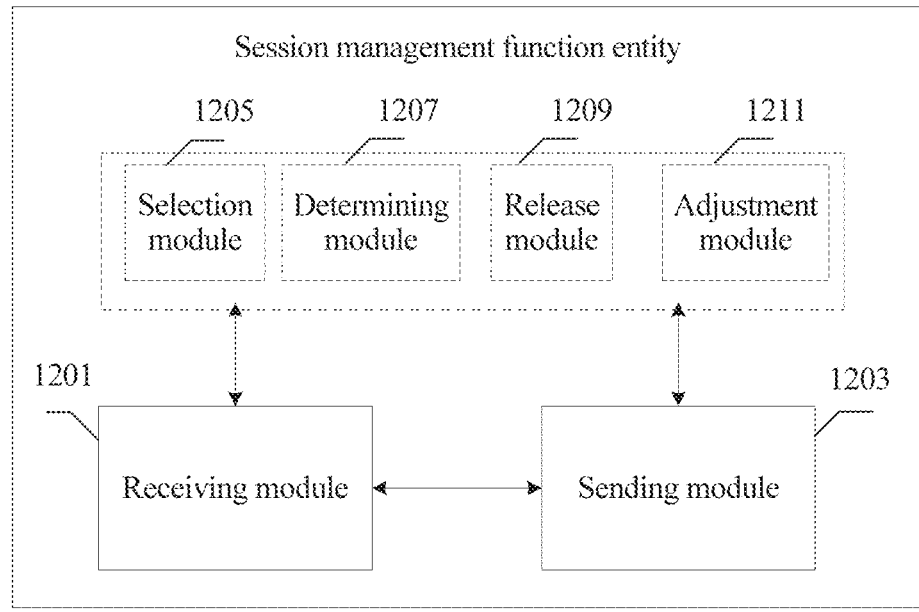
FIG. 12A and FIG. 12B are schematic structural diagrams of a session management function entity according to an embodiment of the present disclosure.

For example, when the foregoing network element implements a corresponding function using a software module, as shown in FIG. 12A, the session management function entity may include a receiving module 1201 and a sending module 1203.

In an embodiment, the receiving module 1201 and the sending module 1203 are configured to interact with a second user plane function entity and a first user plane function entity, respectively, such that the first user plane function entity sends first downlink data of a first session to an access network device via the second user plane function entity, where the first user plane function entity is an anchor of the first session.

The sending module 1203 is further configured to notify, based on a preset condition, the first user plane function entity to buffer second downlink data of the first session.

Optionally, the preset condition includes at least one of the following: SSC information indicates that the first session has a first session and service continuity SSC1 mode; mobility information indicates that a terminal device is a high mobility device; or the session management function entity and the first user plane function entity belong to a same operator network.

Optionally, the receiving module 1201 and the sending module 1203 are further configured to interact with a third user plane function entity and the first user plane function entity, respectively, such that the first user plane function entity sends the second downlink data and third downlink data to the access network device via the third user plane function entity, where the third downlink data is downlink data to be received by the first user plane function entity after the first session is switched to an active state.

Optionally, to implement the foregoing instruction function, the session management function entity further includes a selection module 1205. The selection module 1205 is configured to select, based on the preset condition, the first user plane function entity as a buffer device to buffer the second downlink data. In this case, the sending module 1203 is configured to notify the first user plane function entity to buffer the second downlink data after receiving the second downlink data.

Optionally, the receiving module 1201 is further configured to obtain mobility information of the terminal device. For example, the receiving module 1201 is configured to receive a mobility attribute from a mobility management function entity, where the mobility information is the mobility attribute; or the receiving module 1201 is configured to obtain mobility statistics information, where the mobility information is the mobility statistics information; or the session management function entity further includes a determining module 1207, where the receiving module 1201 is configured to: receive a mobility attribute from a mobility management function entity, and obtain mobility statistics information, and the determining module 1207 is configured to determine the mobility information based on the mobility attribute and the mobility statistics information. The mobility attribute includes at least a high mobility attribute or a low mobility attribute, and the mobility statistics information is used to indicate a movement speed or a stay time of the terminal device. For example, the receiving module 1201 is configured to receive the mobility statistics information from the mobility management function entity, or obtain the mobility statistics information from a network data analytics (NWDA) device.

Optionally, the session management function entity further includes a release module 1209. The release module 1209 is configured to release the second user plane function entity after the selection module 1205 selects the first user plane function entity as a buffer device to buffer the second downlink data.

Optionally, the session management function entity and the third user plane function entity are located in a VPLMN in an HR roaming scenario, and the session management function entity further includes an adjustment module 1211. The adjustment module 1211 is configured to adjust the buffer device, where the buffer device is used to buffer fourth downlink data of the first session after the first session is switched to an inactive state. For example, the adjustment module 1211 is configured to determine the third user plane function entity as the buffer device, or determine the session management function entity as the buffer device.

Therefore, the session management function entity notifies, based on the preset condition, an anchor user plane function entity to buffer the second downlink data. In this way, after the first session is switched to an active state, a transmission path of the second downlink data buffered by the anchor user plane function entity and that of incoming third downlink data that is to be received after the first session is switched to an active state again are the same. Therefore, a problem that downlink data received by a terminal is out of order is avoided. In addition, buffered downlink data can be obtained without establishing an additional forwarding tunnel or releasing a forwarding tunnel again, such that signaling interaction between UPF entities is reduced. Therefore, a delay is reduced, and user experience is improved.

In another embodiment, the receiving module 1201 and the sending module 1203 are configured to interact with a second user plane function entity and a first user plane function entity, respectively, such that the first user plane function entity sends first downlink data of a first session to an access network device via the second user plane function entity. The first user plane function entity is an anchor of the first session. The sending module 1203 is further configured to notify, based on the preset condition, the second user plane function entity to buffer second downlink data of the first session. The preset condition includes: SSC information (for example, obtained by the receiving module 1201) indicates that the first session has a third session and service continuity SSC3 mode. The second downlink data is downlink data to be received by the second user plane function entity after the first session is switched to an inactive state. The receiving module 1201 and the sending module 1203 are further configured to interact with a third user plane function entity and the second user plane function entity, respectively, such that the second user plane function entity sends the second downlink data to the access network device via the third user plane function entity, and the first user plane function entity sends third downlink data to the access network device via the second user plane function entity and the third user plane function entity. The third downlink data is downlink data to be received by the first user plane function entity after the first session is switched to an active state.

Optionally, to implement the foregoing instruction function, the session management function entity further includes a selection module 1205. The selection module 1205 is configured to select, based on the preset condition, the second user plane function entity as a buffer device to buffer the second downlink data. The sending module 1203 is configured to notify the second user plane function entity to buffer the second downlink data after receiving the second downlink data.

Therefore, a data path for transmitting the second downlink data and that for transmitting the third downlink data are the same starting from the second user plane function entity, such that a problem that downlink data received by a terminal is out of order is avoided, and user experience is improved. In addition, buffered downlink data can be obtained without establishing an additional forwarding tunnel or releasing a forwarding tunnel again, such that signaling interaction between UPF entities is reduced. Therefore, a delay is reduced, and user experience is further improved.

Optionally, in another embodiment, the session management function entity may include a receiving module 1201, a sending module 1203, and a release module 1209. The receiving module 1201 and the sending module 1203 may also be implemented by a transceiver module.

The transceiver module is configured to interact with a second user plane function entity and a first user plane function entity, respectively, such that the first user plane function entity sends first downlink data of a first session via the second user plane function entity. The second user plane function entity is a user plane function entity that is of the first session and is connected to an access network device.

The release module 1209 is configured such that when the first session enters an inactive state, the release module 1209 releases the second user plane function entity. For example, the release module 1209 determines, based on at least one of session and service continuity information, mobility information, and policy information, to release the second user plane function entity. For details, refer to the foregoing descriptions. Details are not described again.

Optionally, the transceiver module is further configured to notify the first user plane function entity to buffer second downlink data of the first session. Alternatively, the transceiver module is further configured to notify the first user plane function network element to release a connection between the first user plane function network element and the second user plane function network element, such that the first user plane function entity "automatically" becomes a buffer device to buffer second downlink data after the first session is switched to an inactive state.

Based on the foregoing solution, after the session management function entity deletes the second user plane function entity, the first user plane function entity becomes a new user plane function entity connected to the access network device, and buffers the second downlink data. In this way, after the first session is switched to an active state, a transmission path of the second downlink data buffered by the first user plane function entity and that of incoming third downlink data that is to be received after the first session is switched to an active state again are the same. Therefore, a problem that downlink data received by a terminal is out of order is avoided. In addition, buffered downlink data can be obtained without establishing an additional forwarding tunnel or releasing a forwarding tunnel again, such that signaling interaction between UPF entities is reduced. Therefore, delay is reduced, and user experience is improved.

The selection module 1205, the determining module 1207, the release module 1209, and the adjustment module 1211 all may be implemented by a processing module in the session management function entity.

In addition, the receiving module 1201 and the sending module 1203 in the session management function entity may further implement another operation or function of the SMF device 206 (or the vSMF) in the foregoing method, and may further include another module that performs another function. Details are not described herein.

Figure 12B:
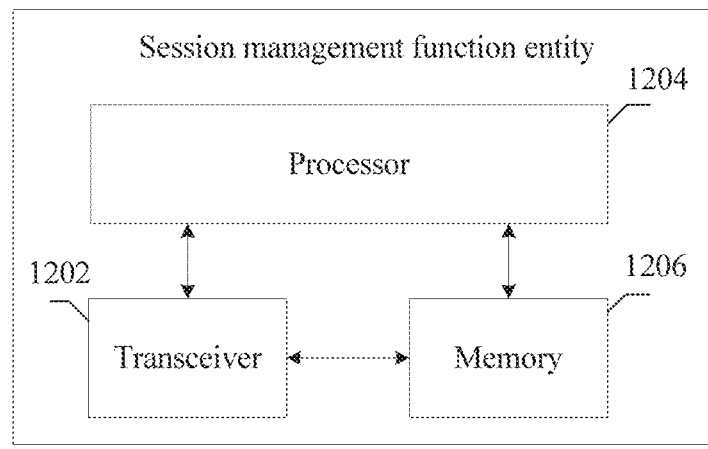

FIG. 12B is another possible schematic structural diagram of the session management function entity in the foregoing embodiment. As shown in FIG. 12B, the session management function entity includes a transceiver 1202 and a processor 1204. For example, the processor 1204 is configured to support the session management function entity in performing a corresponding function of the SMF device 206 (or the vSMF) in the foregoing method. The transceiver 1202 is configured to implement communication between the session management function entity and the foregoing mobility management function entity/user plane function entity/another session management function entity. The session management function entity may further include a memory 1206. The memory 1206 is configured to be coupled to the processor 1204 and store a program instruction and data that are necessary for the session management function entity.

It may be understood that FIG. 12B shows only a simplified design of the foregoing device. In actual application, each device may include any quantity of transmitters, receivers, processors, controllers, memories, communications units, and the like, and all devices that can implement this application fall within the protection scope of this application.

The controller/processor configured to perform functions of the session management function entity in this application may be a central processing unit (CPU), a general purpose processor, a digital signal processor (DSP), an application-specific integrated circuit (ASIC), a field programmable gate array (FPGA), another programmable logical device, a transistor logical device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

Method or algorithm steps described with reference to the content disclosed in this application may be implemented by hardware, or may be implemented by a processor by executing a software instruction. The software instruction may be formed by a corresponding software module. The software module may be stored in a random access memory (RAM), a flash memory, a read-only memory (ROM), an erasable programmable read-only memory (EPROM), an electrically EPROM (EEPROM), a register, a hard disk, a removable magnetic disk, a compact disc (CD) ROM (CD-ROM), or a storage medium of any other form well-known in the art. An example storage medium is coupled to a processor, such that the processor can read information from the storage medium or write information into the storage medium. Certainly, the storage medium may be a component of the processor. The processor and the storage medium may be located in an ASIC. In addition, the ASIC may be located in the session management function entity. Certainly, the processor and the storage medium may exist in the session management function entity as discrete components.

All or some of the foregoing embodiments may be implemented by software, hardware, firmware, or any combination thereof. When the embodiments are implemented by software, all or some of the embodiments may be implemented in a form of a computer program product. The computer program product includes one or more computer instructions. When the computer program instructions are loaded and executed on a computer, all or some of the procedure or functions according to the embodiments of the present disclosure are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device such as a server or a data center into which one or more usable media are integrated. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and beneficial effects of this application are further described in detail in the foregoing example implementations. It should be understood that the foregoing descriptions are only example implementations of this application, but are not intended to limit the protection scope of this application. Any modification, equivalent replacement, or improvement made based on the technical solutions of this application shall fall within the protection scope of this application.

What is claimed is:

1. A communication system, comprising:
    a first user plane function network element, wherein a first session is established between a terminal device and the first user plane function network element, and wherein the first user plane function network element is an anchor user plane function network element of the first session; and
    a session management function network element configured to add a second user plane function network element into a data path of the first session by interacting with the first user plane function network element and the second user plane function network element, wherein the second user plane function network element is connected to an access network device,
    wherein the first user plane function network element is configured to send first downlink data to the access network device via the second user plane function network element,
    wherein the session management function network element is further configured to:
        determine whether to release the second user plane function network element after the terminal device switches to an idle state;
        release the second user plane function network element when the session management function network element determines to release the second user plane function network element; and
        send a buffering indication to the first user plane function network element, wherein the buffering indication instructs the first user plane function network element to buffer downlink data, and
    wherein the first user plane function network element is further configured to:
        receive the buffering indication; and
        buffer second downlink data in response to the buffering indication,
    wherein the session management function network element is further configured to add, after the terminal device switches to a connected state, a third user plane function network element into the data path of the first session by interacting with the first user plane function network element and the third user plane function network element, wherein the third user plane function network element is connected to the access network device, and
    wherein the first user plane function network element is further configured to send the second downlink data and incoming third downlink data to the access network device via the third user plane function network element.

2. The communication system according to claim 1, wherein the session management function network element is further configured to further notify the first user plane function network element to buffer downlink data by sending a session modification request message to the first user plane function network element, and wherein the session modification request message comprises the buffering indication.

3. The communication system according to claim 1, wherein when determining to release the second user plane function network element, the session management function network element is further configured to notify the first user plane function network element to release a connection between the first user plane function network element and the second user plane function network element.

4. The communication system according to claim 1, wherein the session management function network element is further configured to determine to release the second user plane function network element based on policy information.

5. The communication system according to claim 1, wherein the session management function network element is further configured to notify the second user plane function network element to remove session information of the first session.

6. A data buffering method comprising:
    interacting, by a session management function network element, with a second user plane function network element and a first user plane function network element, wherein the first user plane function network element is an anchor user plane function network element of a first session, wherein the second user plane function network element is connected to an access network device, and wherein a transmission path of first downlink data of the first session passes through the first user plane function network element, the second user plane function network element, and the access network device;
    determining, by the session management function network element, whether to release the second user plane function network element after the terminal device switches to an idle state;
    releasing, by the session management function network element, the second user plane function network element when the session management function network element determines to release the second user plane function network element;

sending, by the session management function network element, a buffering indication to the first user plane function network element, wherein the buffering indication instructs the first user plane function network element to buffer downlink data of the first session; and adding, by the session management function network element after the terminal device switches to a connected state, a third user plane function network element into the data path of the first session by interacting with the first user plane function network element and the third user plane function network element, wherein the third user plane function network element is connected to the access network device, and wherein buffered second downlink data and incoming third downlink data on the first user plane function network element are transmitted to the access network device via the third user plane function network element.

7. The data buffering method according to claim 6, wherein sending the buffering indication to the first user plane function network element comprises sending, by the session management function network element, a session modification request message to the first user plane function network element, and wherein the session modification request message comprises the buffering indication.

8. The data buffering method according to claim 6, when determining to release the second user plane function network element, the data buffering method further comprises notifying, by the session management function network element, the first user plane function network element to release a connection between the first user plane function network element and the second user plane function network element.

9. The data buffering method according to claim 6, wherein determining to release the second user plane function network element comprises determining, by the session management function network element, to release the second user plane function network element based on policy information.

10. The data buffering method according to claim 6, wherein releasing the second user plane function network element comprises notifying, by the session management function network element, the second user plane function network element to remove session information of the first session.

11. A session management function entity, comprising:
an interface;
a processor coupled to the interface; and
a non-transitory computer-readable storage medium coupled to the processor and configured to store instructions to be executed by the processor to cause the session management function entity to:
  interact, via the interface, with a second user plane function network element and a first user plane function network element, wherein the first user plane function network element is an anchor user plane function network element of a first session, wherein the second user plane function network element is connected to an access network device, and wherein a transmission path of first downlink data of the first session passes through the first user plane function network element, the second user plane function network element, and the access network device;
  determine whether to release the second user plane function network element after the terminal device switches to an idle state;
  release the second user plane function network element when the session management function entity determines to release the second user plane function network element;
  send a buffering indication to the first user plane function network element, wherein the buffering indication instructs the first user plane function network element to buffer downlink data of the first session, and
  add after the terminal device switches to a connected state, a third user plane function network element into the data path of the first session by interacting with the first user plane function network element and the third user plane function network element, wherein the third user plane function network element is connected to the access network device, and wherein buffered second downlink data and incoming third downlink data on the first user plane function network element are transmitted to the access network device via the third user plane function network element.

12. The session management function entity according to claim 11, wherein the instructions further cause the session management function entity to send a session modification request message to the first user plane function network element via the interface, and wherein the session modification request message comprises the buffering indication.

13. The session management function entity according to claim 11, wherein when determining to release the second user plane function network element, the instructions further cause the session management function entity to notify, via the interface, the first user plane function network element to release a connection between the first user plane function network element and the second user plane function network element.

14. The session management function entity according to claim 11, wherein the instructions cause the session management function entity to release the second user plane function network element based on policy information.

15. The session management function entity according to claim 11, wherein the instructions cause the session management function entity to notify the second user plane function network element to remove session information of the first session.

16. A data buffering method, comprising:
interacting, by a session management function network element, with a second user plane function network element and a first user plane function network element, wherein the first user plane function network element is an anchor user plane function network element of a first session, wherein the second user plane function network element is connected to an access network device, and wherein a transmission path of first downlink data of the first session successively passes through the first user plane function network element, the second user plane function network element, and the access network device;
determining whether to release the second user plane function network element after the terminal device switches to an idle state;
releasing, by the session management function network element, the second user plane function network element when the session management function network element determines to the second user plane function network element;

sending, by the session management function network element, a buffering indication to the first user plane function network element, wherein the buffering indication instructs the first user plane function network element to buffer downlink data of the first session;

receiving, by the first user plane function network element, the buffering indication;

buffering, by the first user plane function network element, second downlink data of the first session in response to the buffering indication;

adding, by the session management function network element after the terminal device switches to a connected state, a third user plane function network element into the data path of the first session by interacting with the first user plane function network element and the third user plane function network element, wherein the third user plane function network element is connected to the access network device; and sending, by the first user plane function network element, the second downlink data and incoming third downlink data to the access network device via the third user plane function network element.

17. The data buffering method according to claim 16, wherein sending the buffering indication to the first user plane function network element, comprises sending, by the session management function network element, a session modification request message to the first user plane function network element, wherein the session modification request message comprises the buffering indication, and wherein receiving the buffering indication comprises receiving, by the first user plane function network element, the session modification request message.

18. The data buffering method according to claim 16, wherein determining to release the second user plane function network element comprises determining, by the session management function network element, to release the second user plane function network element based on policy information.

19. The data buffering method according to claim 16, wherein releasing the second user plane function network element comprises notifying, by the session management function network element, the second user plane function network element to remove session information of the first session.

20. The data buffering method according to claim 16, wherein when determining to release the second user plane function network element, the data buffering method further comprises notifying, by the session management function network element, the first user plane function network element to release a connection between the first user plane function network element and the second user plane function network element.

\* \* \* \* \*